United States Patent
Ghani et al.

(10) Patent No.: US 7,752,119 B2
(45) Date of Patent: Jul. 6, 2010

(54) AUCTION RESULT PREDICTION

(75) Inventors: Rayid Ghani, Evanston, IL (US); Hillery D. Simmons, Chicago, IL (US)

(73) Assignee: Accenture Global Services GmbH, Schaffhausen (CH)

( * ) Notice: Subject to any disclaimer, the term of this patent is extended or adjusted under 35 U.S.C. 154(b) by 1521 days.

(21) Appl. No.: 10/867,597

(22) Filed: Jun. 14, 2004

(65) Prior Publication Data

US 2005/0278243 A1 Dec. 15, 2005

(51) Int. Cl.
*G06Q 40/00* (2006.01)
(52) U.S. Cl. ...................................... 705/37
(58) Field of Classification Search ............... 705/37
See application file for complete search history.

(56) References Cited

U.S. PATENT DOCUMENTS

| | | | | |
|---|---|---|---|---|
| 5,444,819 | A * | 8/1995 | Negishi ..................... 706/21 |
| 5,761,442 | A * | 6/1998 | Barr et al. ................ 705/36 R |
| 6,018,723 | A * | 1/2000 | Siegel et al. .................. 705/38 |
| 6,353,767 | B1 * | 3/2002 | Wakeman et al. ............. 700/91 |
| 6,356,842 | B1 * | 3/2002 | Intriligator et al. ............. 702/3 |
| 7,043,429 | B2 * | 5/2006 | Chang et al. ................ 704/236 |
| 7,072,863 | B1 * | 7/2006 | Phillips et al. ............ 705/36 R |
| 7,346,520 | B2 * | 3/2008 | Etzioni et al. ................... 705/1 |
| 7,493,280 | B2 * | 2/2009 | Guler et al. .................... 705/37 |
| 2002/0082977 | A1 * | 6/2002 | Hammond et al. ............ 705/37 |
| 2002/0174052 | A1 * | 11/2002 | Guler et al. .................... 705/37 |
| 2003/0014346 | A1 * | 1/2003 | Zhang ......................... 705/37 |
| 2003/0018515 | A1 * | 1/2003 | Guler et al. .................... 705/10 |
| 2003/0055773 | A1 * | 3/2003 | Guler et al. .................... 705/37 |

OTHER PUBLICATIONS

Raykhel et al.:Real-time automatic price prediction for-e-bay online trading: Proceedings of the twenty First innovative Applications for Artificial Intelligence (2009), pp. 1-6.*
Ghani et al.: Predicting the end-price of online auctions, Proceedings of International Workshop on Data Mining and Adaptive Modelling Methods for Economics and Management held in conjuction with the 15$^{th}$ European Conference on Machine Learning (ECML/PKDDD 2004), 2004, (Pisa, Italy), pp. 1-11.*
Andale.com Price Finder Web Page, 3 pages.

* cited by examiner

*Primary Examiner*—Hani Kazimi
*Assistant Examiner*—Bijendra K Shrestha
(74) *Attorney, Agent, or Firm*—Brinks Hofer Gilson & Lione

(57) ABSTRACT

An auction analysis system predicts auction results. The analysis system may determine item, seller, or auction characteristics from prior or pending auctions. The analysis system also obtains item characteristics of an item for which a result prediction is sought, either by a buyer or by a seller. A price predictor in the system accepts the auction and item characteristics and predicts an auction result based on the characteristics.

31 Claims, 7 Drawing Sheets

AUCTION RESULT PREDICTION

BACKGROUND

1. Technical Field

This invention relates to data processing systems that may predict an auction result. The invention may find particular use in predicting an end-of-auction cost for an item sold in an online auction.

2. Background Information

Online marketplaces have become significant commercial entities. It is estimated that these marketplaces, such as EBAY, YAHOO! SHOPPING AUCTIONS, and AMAZON.COM AUCTIONS, will account for 25 percent of ecommerce by 2005. Even today, EBAY, one of the largest online marketplaces, typically offers 19 million items for sale at any given time. In 2003, $24 billion of goods were sold on EBAY, which maintained a $57 billion market value and had $2.4 billion in revenue. Although online marketplaces such as EBAY offer these individuals a unique opportunity to sell their goods, the value for any given item sold at auction is inherently hard to predict for several reasons.

First, the condition of items can differ in many different ways, regardless of how similar the items are to one another. Buyers may be willing to pay a premium for new or like-new items, while items that exhibit years of wear and tear may command a lower price. Second, most online auctions offer a variety of shipping options. For example, the buyer may have to pay all shipping costs, the seller may assume all shipping costs, or the buyer and seller may split shipping costs. Thus, the total payment due to a seller may not only include the final purchase price, but also all, none, or some of the cost of shipping the item. Third, most online marketplaces have established selling rating systems to provide transaction feedback and increase buyer confidence. The seller rating may affect the value of a winning bid since, for example, a highly rated seller may attract additional bids, while a lower rated seller may not receive as many.

Fourth, item descriptions for substantially identical items item may vary dramatically. For example, some sellers may include images of the item, while others may not. The value of a winning bid may vary with the effectiveness of the item description, including the presence or absence of images. Fifth, each auction begins and ends at specified times. When coupled with the fact that 15% of auctions are won in the last minute, the timing of an auction can play a factor in the value of the winning bid. For example, the same item may command a higher premium at an auction that ends at 3:00 PM as opposed to an auction 3:00 AM. The difficulties in predicting the auction outcome may discourage both buyers and sellers from entering the online market. Among other concerns, sellers may not want to risk low winning bids, and buyers may not want to risk the silent bidding process that chases the item cost ever higher In the past, few if any tools were available to analyze auctions. For example, the Andale.com website, created by Andale, Inc. of Mountain View, Calif., determines average item selling prices based on past auction data. Simple price averaging may provide a crude price approximation, but, based on price information alone, it is a relatively inaccurate estimator.

Accordingly, there exists a need for methods and systems that may accurately predict an auction result.

BRIEF SUMMARY

An auction analysis system predicts auction results. The analysis system may retrieve, obtain, or derive item, seller, or auction characteristics from prior or pending auctions. The analysis system also may obtain, retrieve, or derive item characteristics of an item for which a result prediction is sought, either by a buyer or by a seller. The analysis system may include a price prediction program that accepts the auction and item characteristics and that predicts a result based on one or more of the characteristics.

A method for auction result prediction may include obtaining a seller-input characteristic for an auction item, obtaining historical auction data related to the auction item, and providing the seller-input characteristic and the historical auction data to a result prediction program. The result prediction program may return an end-of-auction price, an end-of-auction price range, an end-of-auction price threshold, or other result predictions.

A result prediction system may include a processor, a memory, and a result predictor. The memory may store auction characteristics such as those directly specified by a seller or a buyer for any given item. The memory may also store historical auction characteristics for similar auction items. The result predictor may include circuitry or logic that accepts the buyer or seller specified auction characteristics and the historical characteristics and that provides one or more predicted auction results.

DETAILED DESCRIPTION

As an initial matter, although the description below proceeds with reference to auction result prediction for personal digital assistants (PDAs) offered for sale in an online marketplace, the price prediction technology may be applied to auction result prediction for any type of goods or services bought or sold in any type of auction marketplace. The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as stored in program, data, or multipurpose system memories, all or part of systems and methods consistent with the price prediction technology may be stored on or read from other machine-readable media, for example, secondary storage devices such as hard disks, floppy disks, and CD-ROMs; electromagnetic signals; or other forms of machine readable media either currently known or later developed.

Furthermore, although specific components of price prediction technology are described and illustrated, methods, systems, and articles of manufacture consistent with the price prediction technology may include additional or different components. For example, a processor may be implemented as a microprocessor, microcontroller, application specific integrated circuit (ASIC), discrete logic, or a combination of other types of circuits acting as explained above. Databases, tables, and other data structures may be separately stored and managed, incorporated into a single memory or database, or generally logically and physically organized in many different ways according to many different file types, file structures, or file standards. The programs discussed below may be parts of a single program, separate programs, or distributed locally or remotely across several memories and processors. For example, the price prediction system may be wholly or partly implemented on a home personal computer, at an auction web server, a third-party server, or at one or more other locations.

Figure 1:
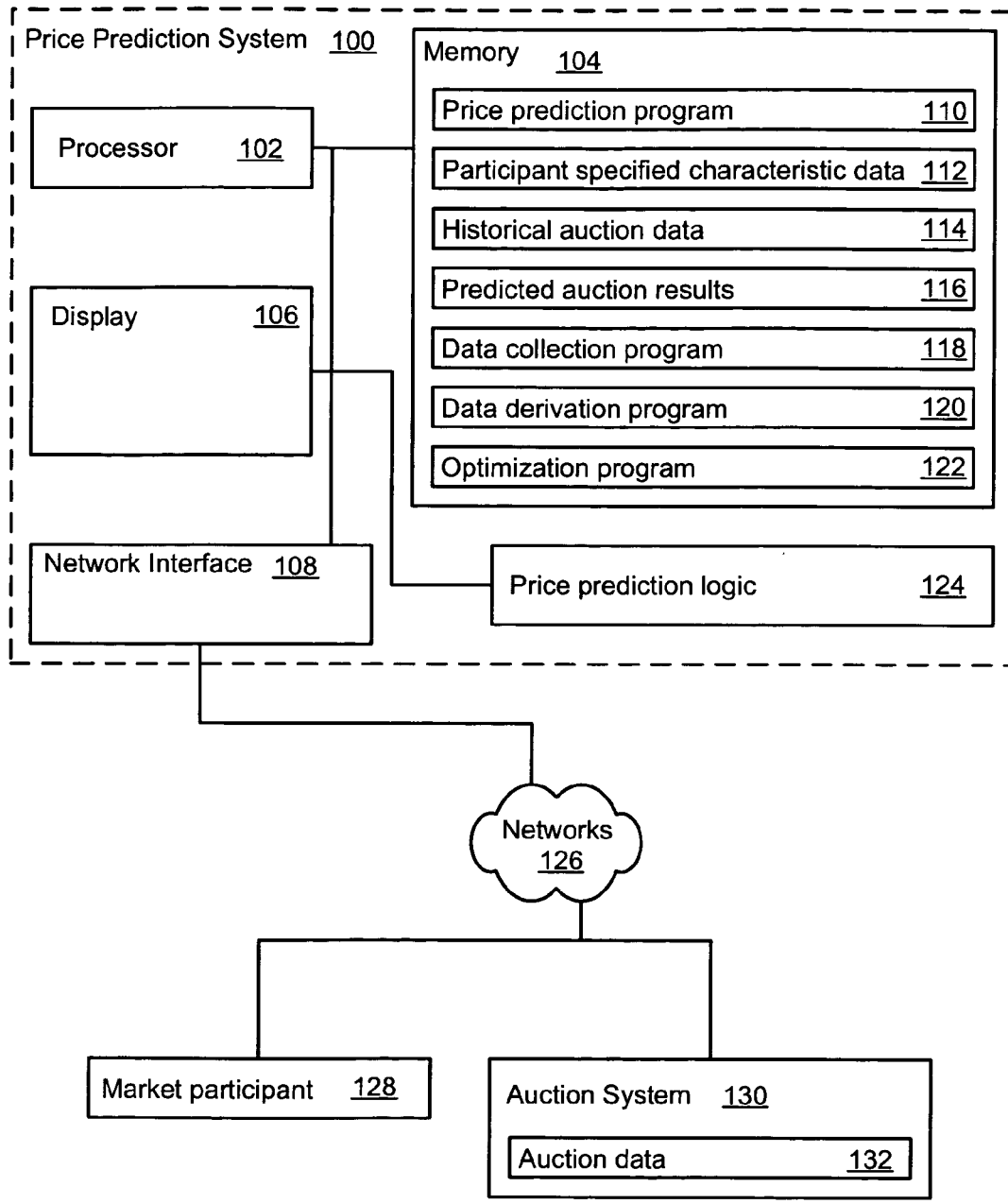
FIG. 1 shows an auction result prediction system.

FIG. 1 shows a price prediction system 100. The price prediction system 100 may include a processor 102, a memory 104, and a display 106. In addition, a network interface 108 may be present.

The memory 104 may store a price prediction program 110, participant item-characteristic data 112, and historical auction data 114. In addition, the memory 104 may store predicted auction results 116, as well as a data collection program 118, data derivation program 120, and an optimization program 122.

Result prediction logic 124 or circuitry may also be present in the price prediction system 100. The result prediction logic 124 may be hardware and/or software separate from or integrated with the processor 102 and memory 104 that predicts auction results. For example, the result prediction logic 124 may implement a stand alone neural network. The price prediction logic 124 and the price prediction program 110 are examples of price predictors that the system 100 may employ to generate predicted auction results. In other words, while the price prediction program 110 is one form of a price predictor (and may itself implement neural network processing in software), the price prediction system is not limited to using a program in the memory 104 for auction result prediction.

The network interface 108 may include a network interface card or other network connection device to connect the price prediction system 100 to internal or external networks 126. The networks 126 may connect to one or more market participants 128 and auction systems 130. The market participants 128 may represent, for example, the personal computers of buyers and sellers engaged in online auctions, or other interested parties. The auction systems 130 may represent an online auction service such as Ebay or Yahoo. The auction systems 130 may maintain auction data 132 for their past and present auctions. The auction data 132 may include auction title, selling price, shipping costs, seller identification, and many other parameters such as those explained below.

Figure 2:
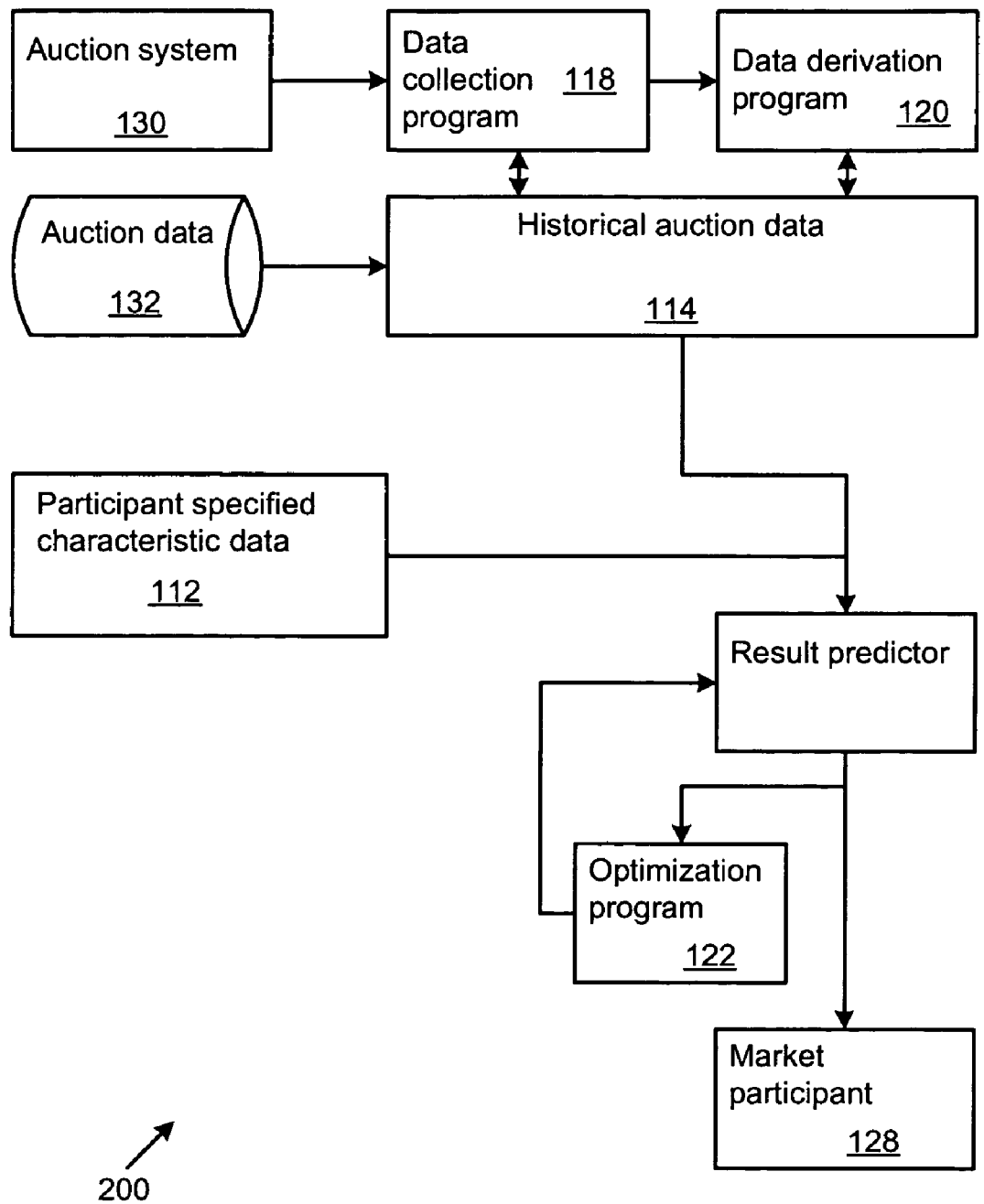
FIG. 2 shows data flow in the auction result prediction system.

Turning briefly to FIG. 2, a data flow diagram 200 summarizes the movement of data through the system 100. The elements illustrated in FIG. 2 are discussed in more detail below. The data collection program 118 determines item, auction, or participant characteristics. The data collection program 118 may determine the characteristic data from webpages or other information stored, generated, or accessible from the auction system 130. In addition, the data derivation program 120 may determine additional characteristics from the characteristics obtained from by the data collection program 118, or directly from the information obtained from the auction system 130. The collected and derived characteristics may be stored in the historical auction data 114.

In certain implementations, the result predictor may be trained or perform parameter estimation based on some or all of the historical auction data 114. The optimization program 122 may play a role in the training process. For example, the optimization program 122 may evaluate the result predictions generated by the result predictor against known results and modify parameters in the result predictor for improved accuracy. To that end, an optimization tool such as the Clementine™ software available from SPSS of Chicago, Ill., may be employed to train the price predictor.

The result predictor generates auction result predictions and delivers one or more of the predictions to the market participant 128. The result predictor may accept the participant specified characteristic data 112 and generate a predicted auction result based on the characteristic data 112. The participant may submit the characteristic data 112 over a communication channel such as a network link, directly into the system 100 through keyboard, mouse, or another input device, or in another manner.

The participant specified characteristic data 112 may include one or more characteristics of an item for which auction result prediction may be sought. A buyer, seller, or other participant may provide the specified characteristic data 112. The specified characteristic data 112 may relate to an auction item itself, such as manufacturer, model number, feature information such as screen size, internal memory, or other auction item characteristics such as those noted in the tables below. Examples of item characteristic data for a PDA are "M125" for a model number "M125" and "16 MB" for a memory capacity.

The specified characteristic data 112 may also relate to an auction for the item, such as an auction title, auction item category, item description, an auction start date and/or time, auction duration, presence or absence of an item image, or other characteristics such as those noted in the tables below. An example of auction characteristic data for a PDA that will be auctioned is the auction title: "Like New Palm M125-16 MB." The specified characteristic data 112 is not limited to item characteristics or auction characteristics, but may include any other data that a price predictor may employ when generating a price prediction.

The historical auction data 114 may represent item, auction, or other data for one or more completed auctions. The historical auction data 114 may include data from successful and unsuccessful auctions. Examples of historical auction data include final price, shipping cost, seller ranking, and other characteristics such as those noted in the tables below.

Figure 4:
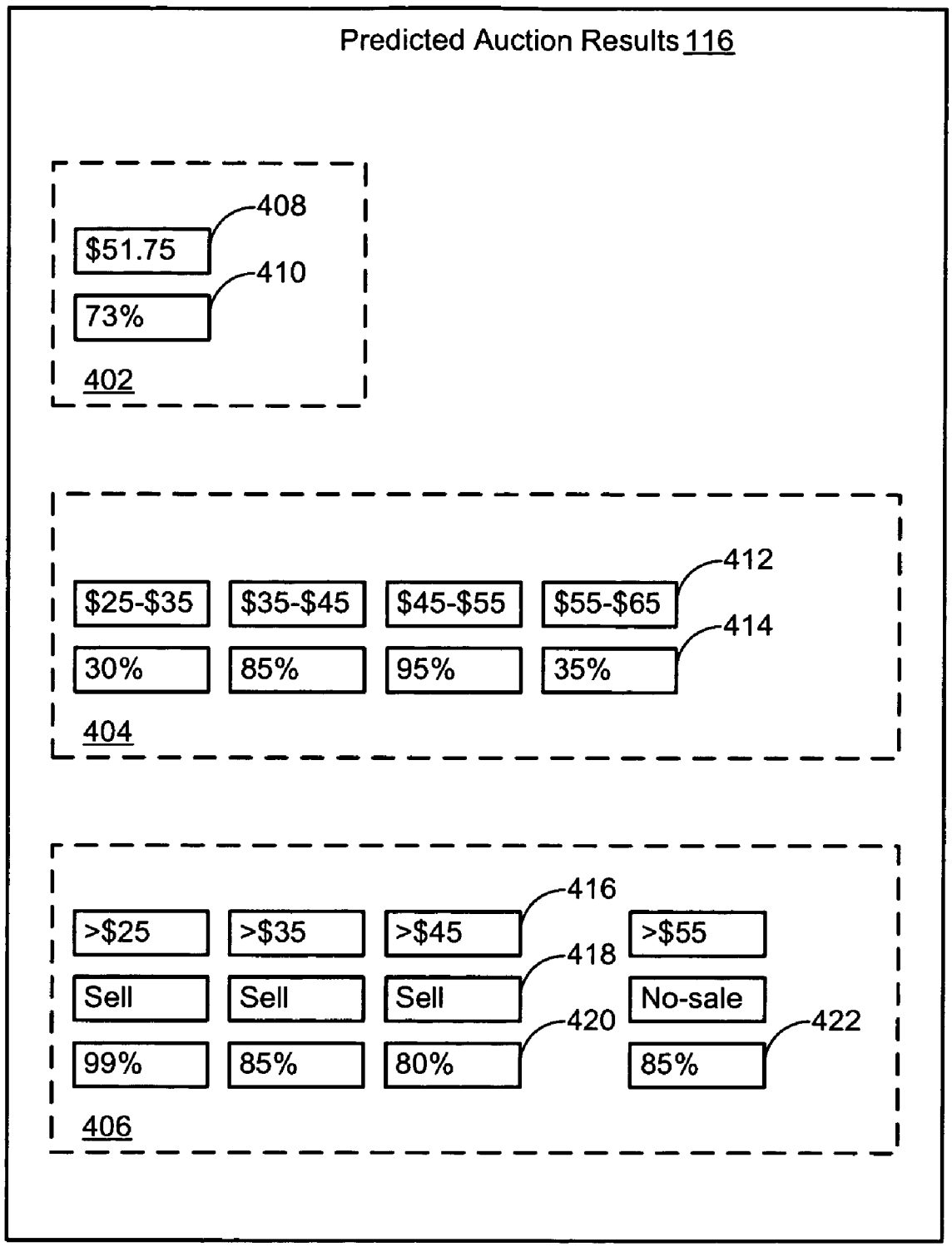
FIG. 4 shows predicted auction results.

Turning to FIG. 4, that figure shows examples of the predicted auction results 116 that a price predictor may generate. The techniques that the price predictor may employ are discussed in more detail below. The predicted auction results may include a predicted end-of-auction price 402, predicted end-of-auction price ranges 404, and predicted end-of-auction price thresholds 406.

The predicted end-of-auction price 402 may include a price prediction 408 and may also include a price prediction confidence measure 410. The price prediction 408 may be a single value that is the predicted final price for an auction. The confidence measure 410 may give the confidence that the price predictor has in the price prediction 408. In the example shown in FIG. 4, the price predictor is 73% confident that the final auction price will be $51.75.

The predicted end-of-auction price ranges 404 may include one or more price bins 412 and may also include associated bin confidence measures 414. A price bin 412 may include a lower value and an upper value that bounds the bin. For example, the price bin 412 has a lower value of $55 and an upper value of $65. The bin confidence measure 414 indicates that the price predictor is 35% confident that the final auction value will be between $55 and $65.

The predicted end-of-auction price thresholds 406 may include one or more price thresholds 416, associated result indicators 418, and associated confidence measures 420. The price thresholds 416 may specify a lower or upper bound on the predicted auction result. For example, the price threshold 416 represents a lower bound of $45. The result indicator 418 may specify whether the auction will obtain a particular result for the item. For example, the result indicator 418 specifies that the item will sell. The confidence measure 420 may specify the confidence that the price predictor has in the price threshold 416 and/or result indicator 418. The confidence measure 420 indicates that the price predictor is 80% confident that the item will sell for at least $45. The confidence measure 422 indicates that the price predictor is 85% confident that the item will not sell for more than $55.

The bins 412 and/or thresholds 416 may be selected according to any criteria. For example, the bins and/or thresholds 412 and 416 may be selected to cover the range of final auction prices for an item over any selected time period (as examples, 1 week, 1 month, or 1 year). Alternatively, the number of bins or thresholds, and their extents may be selected according to statistical metrics. For example, the width of a bin may be selected according to a standard deviation in final price for an item over any selected time period. As another example, the width of a bin may be selected to be 5%, 10%, or another fraction of the average final price for an item over any selected time period. The bins and thresholds may be revised at any interval, periodically, or according to any other schedule or directive by the system 100 based on the historical auction data 114.

Returning to FIG. 1, in one implementation, the system 100 may obtain historical auction data 114 from the auction systems 130 under a license, fee, purchase plan, subscription, or other arrangement. The system 100 may then download the auction data 132 periodically or at other intervals and update its historical auction data 114.

When the historical auction data 114 is obtained directly from the auction system 130, the system 100 may omit execution of the data collection program 118 and instead update its historical auction data 114 with auction data 132 obtained from the auction system 130. Alternatively or additionally, the data collection program 118 in the memory 104 may execute periodically, on a pre-selected schedule, when instructed, or at other times. The data collection program 118 may obtain all or part of the historical auction data 114. The historical auction data 114 may include auction item characteristics, auction characteristics, and participant (e.g., buyer or seller) characteristics such as seller rating, seller marketplace membership information (e.g., membership start or end date) or other characteristics.

In operation, the data collection program may send data requests to the auction system 130, parse replies from the auction 130 and store characteristic data as historical auction data 114. In one implementation, the data collection program 118 may include one or more Practical Extraction Report Language (PERL) scripts.

The scripts may send data requests by building a data request string and communicating the data request string to the auction system 130. For example, given an auction category for a PDA, the script may build a uniform resource locator (URL) corresponding to an item category search including the PDA auction category that is constructed for parsing by any given auction system 130. Alternatively, the script may build a search URL specifying any other item, auction, or participant characteristic. The script may then submit the URL to a web browser or other communication program for submission to the auction system 130. The scripts and web browser may also emulate mouse or keyboard input, or take other actions to cause the auction systems 130 to generate web pages that include pending or completed auction data.

The auction system 130 responds to the data request by sending data resulting from the request to the system 100. The data may be in text, HTML, images, or other file types. For example, the auction system 130 may respond with one or more pages of HTML that include search results.

In response, the data collection program 118 may parse the search results to extract any desired characteristics. For example, a PERL script may search the HTML for tags or other flags that delimit an auction title, seller rating, item description, shipping information, or other item, auction, or participant characteristics.

Figure 3:
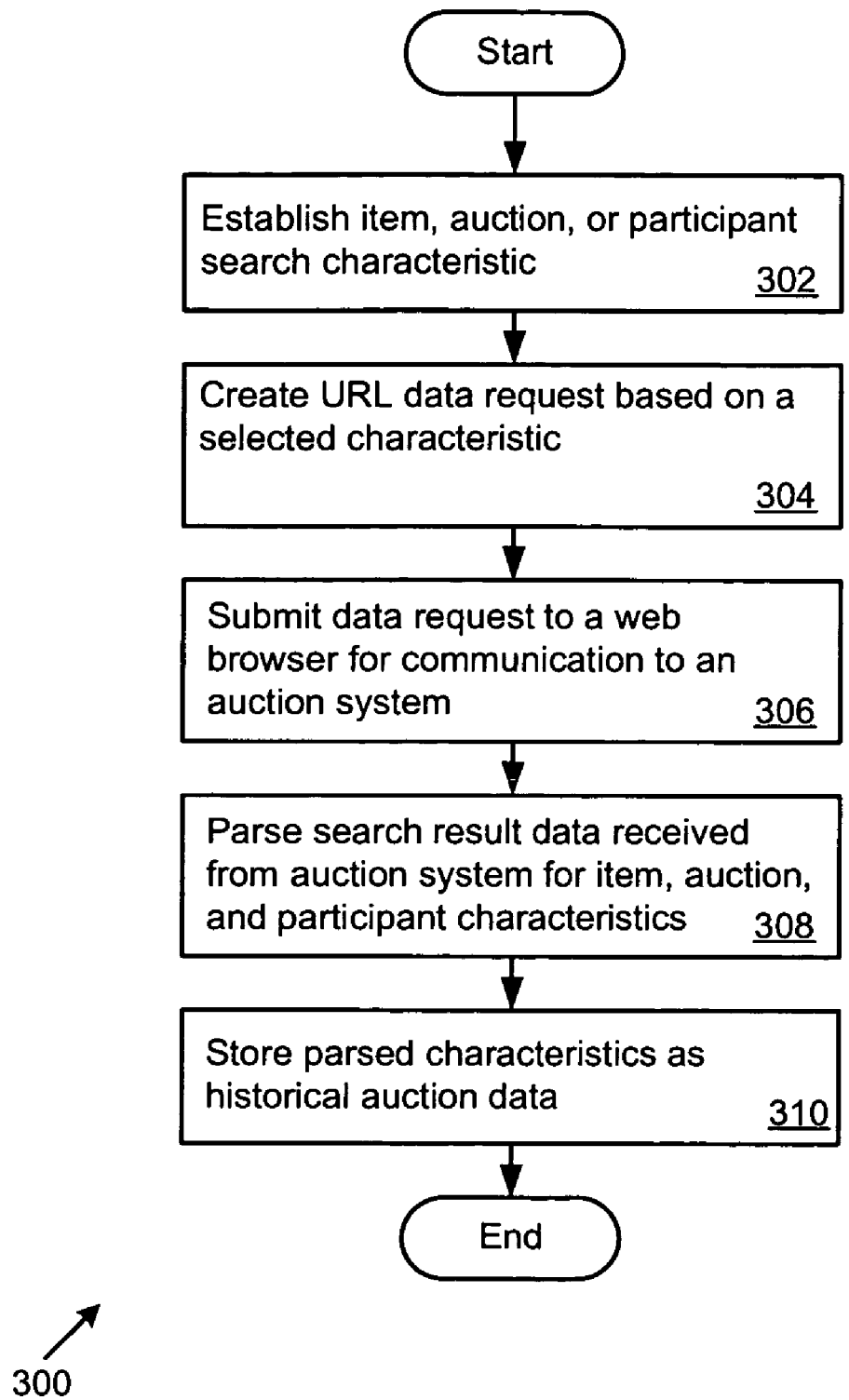
FIG. 3 shows the acts that may be taken by a data collection program.

In FIG. 3, a flow diagram 300 shows the acts that may be taken by the data collection program 118. The data collection program 118 establishes an item, auction, or participant characteristic for which to search (Act 302). The characteristic may be based on the participant specified characteristic data 112. For example, when a seller requests a price prediction for a PDA, the data collection program may select a PDA auction category as the search characteristic.

The data collection program 118 may create a data request (Act 304). The data request may be a URL search string incorporating the search characteristic (Act 304), or may take another form. The data collection program 118 may then submit the data request to a web browser or other communication program for communication to an auction system 130 (Act 306).

The auction system 130 responds with search result data for prior and pending auctions. The data collection program 118 may then parse the search result data (Act 308). For example, PERL scripts may search HTML data for any item, auction, or participant characteristic. The parsed characteristics may be stored as historical auction data (Act 310).

For example, for each item for which a participant requests a predicted auction result, the data collection program 118 cause the system 100 to create a database record. The database record may include one or more of the parameters noted in the tables below. The data collection program 118 may parse the search results to obtain one or more of the parameters.

In addition, the data derivation program 120 may parse the search results and manipulate them to derive additional characteristics from those available directly from the search results. Examples of derived characteristics are given below in the Tables. In one embodiment, the characteristic derivation program 120 may include one or more PERL scripts operable to analyze the text, html, sound files, images, or other data in the search results. For example, the data derivation program 120 may derive item characteristics from an auction title obtained by the data collection program 118.

To that end, a PERL script may scan the auction title for keywords such as "New", "Like New", "Broken", "Sealed", or other keywords. If, for example, the data collection program 118 has obtained the auction title "Like New Palm M125-16 MB", the data derivation program 120 may search the auction title and find the phrase "Like New". The data derivation program 120 derives that the PDA is in like new condition from the auction title and may accordingly store the derived characteristic in the historical auction data 114.

The data derivation program may analyze pending or prior auctions for similar items. A similar item may be an item that shares one or more characteristics, collected, derived, or otherwise, with the participant specified item characteristics 112. For example, a specified item characteristic for a PDA may be the model number M125. Pending and prior auctions that include the keyword "M125" in the title may be considered auctions for similar items.

The data derivation program 120 may also derive auction metrics from one or more prior auctions. As one example, the the data derivation program 120 may determine a count of the number of auctions for a similar item that end in 5 minutes from the start of an auction for the participant specified item. As another example, the data derivation program 120 may determine a standard deviation of the closing prices of similar items ending 5 minutes before the participant specified item. Additional examples are given below in the Tables.

Figure 6:
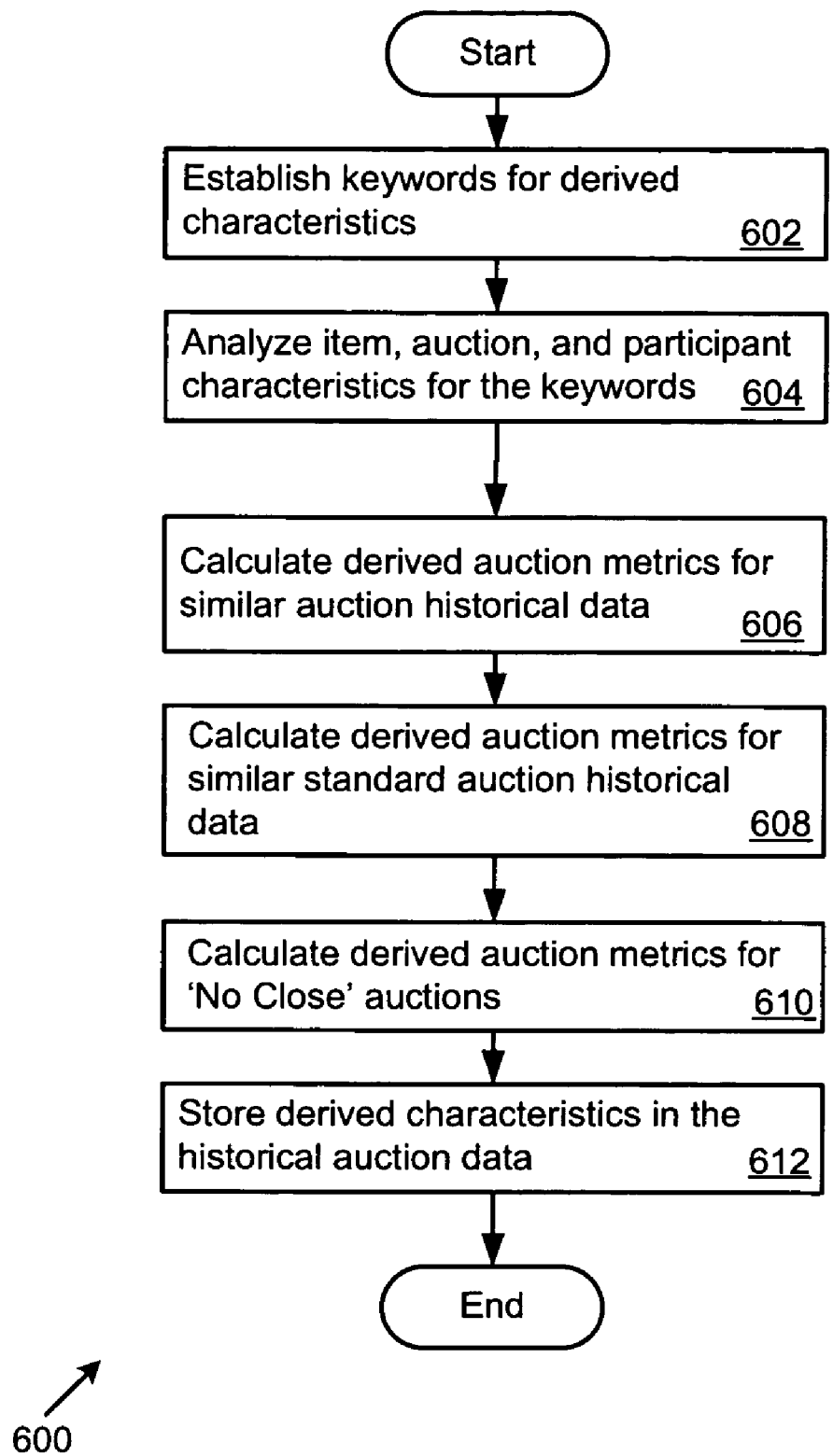
FIG. 6 depicts the acts that may be taken be a characteristic derivation program.

Turning briefly to FIG. 6, a flow diagram 600 shows the acts that may be taken by the data derivation program 120. The data collection program 118 establishes an item, auction, or participant keywords (e.g., "Like New") for which to search (Act 602). The keywords may be selected to extract any characteristic from item, auction, and participant characteristics (Act 604).

The data derivation program 120 may also calculate auction metrics for similar auctions as noted above (Act 606). Additional auction metrics may be calculated for "standard" auctions (Act 608) and "No Close" auctions (610). However, the data derivation program 120 may calculate auction metrics for any subset of auctions or for all auctions. The data derivation program 120 stores the derived characteristics, including the auction metrics, in the historical auction data 114.

No close auctions are auctions for items that did not sell because, as examples, the reserve price was not met or no one bid. A standard auction may be defined in different ways. In one implementation, a standard auction may be an auction for which pre-selected auction characteristics are set or are not set. A non-standard auction may also be an auction for which pre-selected auction characteristics are set or are not set, but that differs in one or more characteristic from the standard auctions. For example, an auction for which a "dutch auction" characteristic or a reserve price characteristic is true or present may be considered a non-standard auction.

A "standard" auction and a "non-standard" auction are specific examples of subsets of all auctions. There may be multiple types of auctions that qualify as standard auctions, non-standard auctions, or any other subset of auctions. For example, one type of non-standard auction may be a dutch auction and a second type of non-standard auction may be a reserve price auction. As another example, a standard auction may be a 5-day auction with no-reserve price or a 7-day auction with an attached image. The system 100 may collect or derive auction characteristics for all auctions or for subsets of all the auctions. The system 100 may collect or derive the same or different characteristics for a subset of auctions that it does for all auctions.

Figure 5:
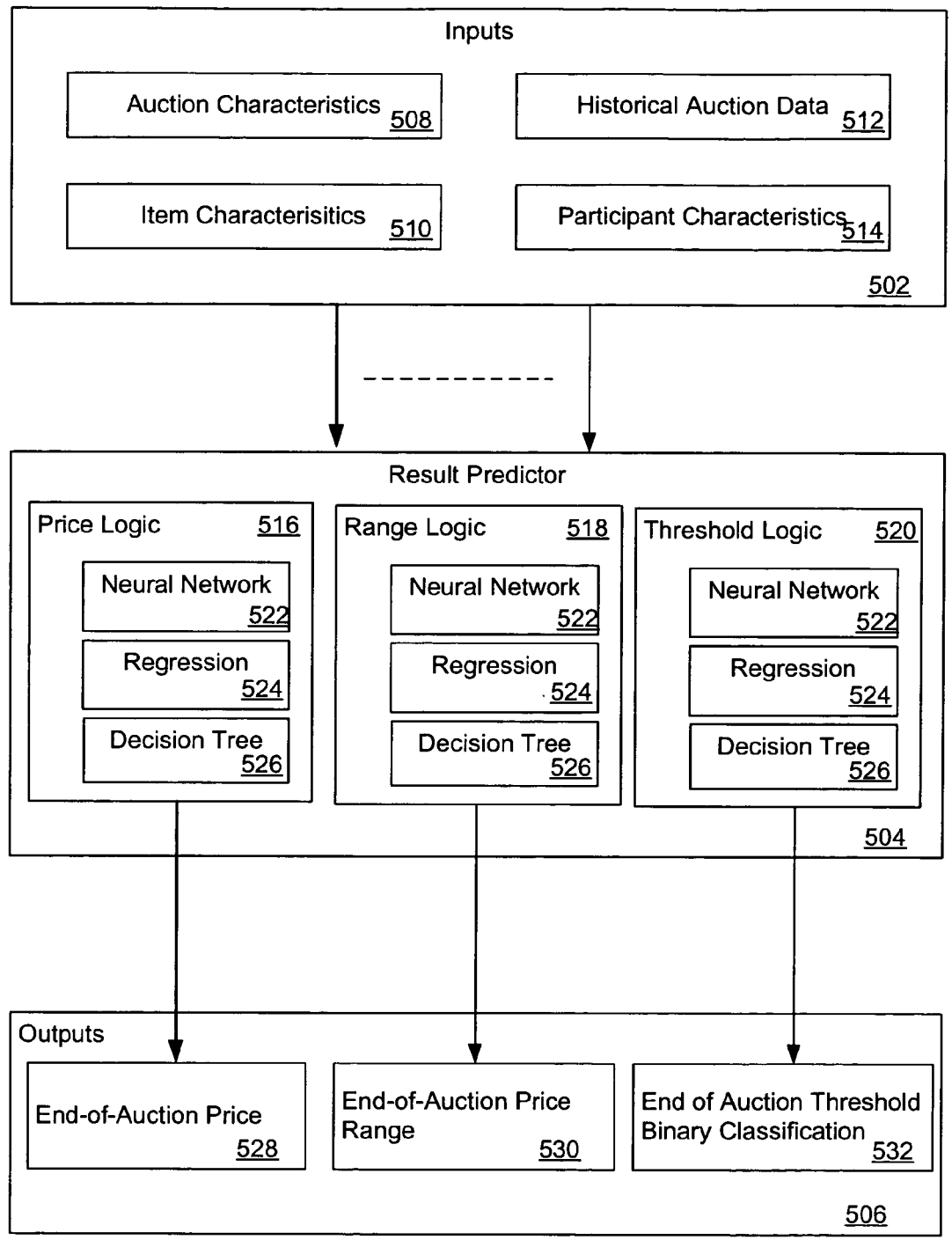
FIG. 5 shows result prediction inputs, result predictors, and result predictions.

In FIG. 5, examples of price prediction inputs 502, price predictors 504, and result predictions 506 are shown. The inputs 502 that describe item, auction, and participant characteristics for prior and pending auctions are provided to a result predictor 504, which creates end-of-auction result outputs 506 for the selected auction. The price prediction inputs 502 may include auction characteristics 508, item characteristics 510, historical auction data 512, participant characteristics 514, or other characteristics. One or more of the characteristics, collected, derived, or otherwise, may be provided to the price predictor 504.

The result predictor 504 may include three types of prediction logic, circuitry, or algorithms: price logic 516, range logic 518, and threshold logic 520. Each type of result predictor 504 may generate confidence measures in concert with performing a result prediction. The price logic 516 may generate an end-of-auction price and/or a confidence measure as a predicted auction result. The range logic 518 may generate an end-of-auction price bin and/or confidence measure as a predicted auction result. The threshold logic 520 may produce an end-of-auction threshold or binary classification, confidence measure, and/or result indicator as a predicted auction result. The price predictor may include multiple different types of prediction logic 516, 518, and 520 to generate one or more predicted auction results, such as a single combined result prediction output.

The prediction logic 516, 518, and 520 may include one or more machine learning algorithms to determine result predictions 506. Any type of prediction logic 516, 518, and 520 may employ neural networks 522, regression logic 524, and decision tree logic 526. In one embodiment, one machine learning algorithm may determine the auction result predictions 506. Alternatively, multiple machine learning algorithms may be used to generate one or more of the auction result predictions 506. An output for each algorithm included in the price predictor 504 may be included. Alternately, one or more result predictions 506 may be statistically combined to produce fewer result predictions.

The prediction logic 516, 518, and 520 may vary widely in implementation. For example, the neural networks 522 may be a real or virtual device employing interconnected processing elements that adapt and learn from past patterns. In practice, neural networks comprise a number of interconnected processing elements that send data to each other along connections of varying strength. The strengths of the connections are represented by weights. The processing element receives inputs, either directly from inputs to the system 100 or from other processing elements. Each of the inputs is then multiplied by a corresponding weight, and the results are added together to form a weighted sum. A transfer function may be applied to the weighted sum to obtain a value known as the state of the element. The state is then either passed on to another element along a weighted connection, or provided as an output signal. Collectively, states are used to represent information in the short term, while weights represent long-term information or learning. The network may be trained by repeatedly presenting inputs having a known output such as historical auction data 114, comparing the network 522 output to the known result, and modifying the weights to reduce or minimize errors.

The prediction inputs 502 may be input to the trained neural networks 522. The neural networks 522 may provide multiple price threshold outputs. The weighted sum or state information of the processing element driving the price threshold output may represent, or may be used to determine, a confidence measure in the predicted result.

The regression logic 524 may implement any type of regression algorithm, such as a linear regression algorithm, a logistic regression algorithm, a polynomial regression algorithm, or a kernel regression algorithm. A linear regression algorithm may fit a straight line through a set of points using some goodness-of-fit metric. The set of points may correspond to characteristics of historical auction results. In one embodiment, one or more of the N input characteristics may contribute to a linear regression equation that fits the set of points. The coefficients for each variable in the linear regression equation may then be applied to a subsequent auction to produce a result prediction.

The decision tree logic 526 may generate a representation of alternatives in a decision making process. For example, the decision tree logic 526 may be constructed using historical data 114 to define a series of nodes. The nodes are interconnected with one another based on dependencies, with each path having a corresponding probability of occurrence. The value of each input 502 characteristic may be used to traverse the tree in order to predict an auction result. The probabilities of each node encountered may be combined to determine a confidence in the predicted outcome.

The result predictions 506 may include an end-of-auction price 528, an end-of-auction price range or bin 530, and/or an end-of-auction price threshold 532. Each prediction 506 may be associated with a confidence measure. FIG. 4 describes the result predictions 506 in additional detail.

Figure 7:
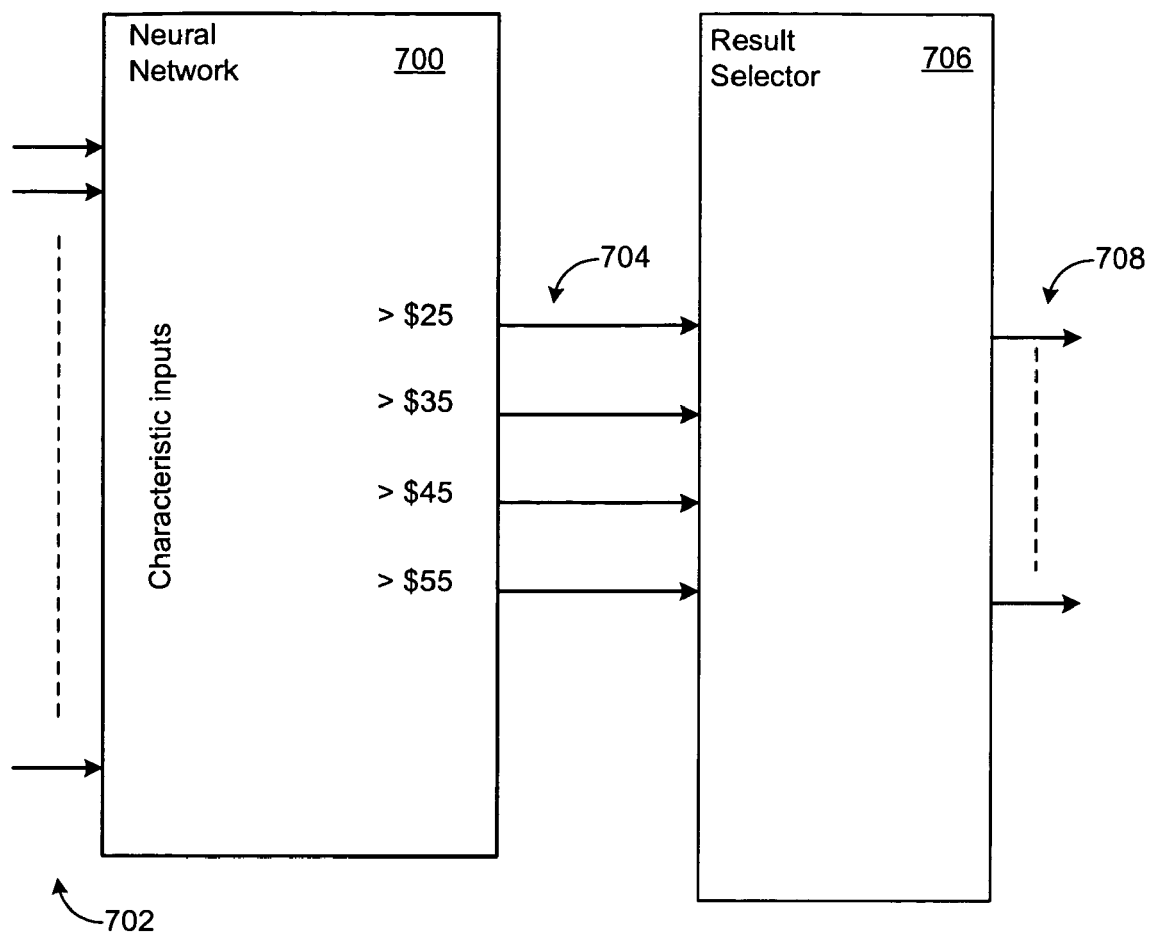
FIG. 7 shows a neural network auction result predictor

In FIG. 7, a result predictor in the form of a neural network 700 is shown. The neural network 700 may be implemented in hardware, software, or both, and may be trained on all or part of the historical auction data 114 (e.g., 40% of the historical auction data) or on other data. The neural network 700 may include parameter inputs 702, and result prediction outputs 704.

The neural network parameters such as momentum terms, learning rates, parameter decay, and other parameters may vary widely between implementations. Examples are given below for an implementation with the Clementine™ tool. As one example, the neural network 502 may employ a learning rate with Alpha approximately 0.7, an initial value of Eta of approximately 0.4, an upper value of Eta approximately 0.1, a lower value of Eta approximately 0.01, and an Eta decay value of approximately 20.

The Alpha parameter may be a momentum term and may be used in updating the weights during training. The momentum term may keep weight changes moving in a consistent direction. Higher values of the momentum term may help the neural network escape local minima. The Eta parameter may be a learning rate. The learning rate may control how much the weights are adjusted at each update. The learning rate may change or remain constant as training proceeds.

The initial value of Eta may give the starting value of the Eta parameter. During training, the Eta parameter may start at the initial value of Eta and decrease to the lower value of Eta. The Eta parameter may then reset to the upper value of Eta and decrease to lower value of Eta one or more times during training. The Eta decay value may specify the rate at which the Eta parameter decreases. The Eta decay may be expressed as the number of cycles over which the Eta parameter changes from the upper value of Eta to the lower value of Eta.

The neural network 700 may include one or more hidden layers with approximately 20 processing elements, and persistence of approximately 200. Each result prediction output 704 may represent a binary classification or end-of-auction threshold. The value of the state or weighted sum at each prediction output 704 may reflect a confidence measure for the price threshold assigned to the prediction output 704.

In one embodiment, a result selector 706 may be coupled to the neural network 700. The result selector 706 may accept one or more prediction outputs 704 and determine one or more result predictions 708 to deliver to a marketplace participant 128. For example, the result selector 706 may respond to configuration settings provided by the participant 128 to deliver the most likely of the price predictions, all of the price predictions, a price prediction at which a result indicator transitions from "Sell" to "No Sell", or any other price prediction. With reference to FIG. 4, the result selector 706 may deliver a price prediction of "Sell for more than $45, with 80% confidence" as the most likely result. Alternatively, the result selector 706 may deliver all or a subset of the predicted price thresholds, confidence measures, and result indicators to the participant 128. When multiple result predictions are approximately equally likely, the result selector 706 may choose the first result prediction, average the result predictions, select a result prediction at random, deliver all the result predictions to the participant, or determine the result prediction to deliver in another manner.

The result prediction technology lends itself to a variety of applications. Predicting an end-price before an auction starts provides an opportunity for a third-party to offer price insurance to sellers. An insurer may obtain a predicted end-price from the system 100, and may offer a seller or other individual or entity insurance that the auction item will sell for at least an insured price. The insured price may be the most likely predicted end-price, but is not limited to the most likely end-price. In return, the insurer may collect an insurance premium. The terms of the insurance may specify, for example, that if the auction item sells for less than the predicted end-price, the insurer will reimburse the seller for the difference between the insured price and the selling price.

Another application of the result prediction technology is a listing optimizer. The listing optimizer may assist sellers in creating auctions with characteristics tailored to achieve higher end-prices. For example, a seller may input item characteristics for an item they will sell, participant characteristics that describe the seller, or other characteristics. The listing optimizer may then run end-price predictions in which one or more of the characteristics are varied between predictions. The listing optimizer may track each end-price and modify the input characteristics to determine their influence on the end-price. After one or more predictions, the listing optimizer may identify changes to item, auction, or seller characteristics that may increase the end-price. Accordingly, the listing optimizer may communicate suggestions to the seller for setting the item, auction, or seller characteristics such as starting time, starting bid, use of photos, reserve price, words to describe the item, or other characteristics that may increase the end-price.

The result prediction technology may provide accurate auction result prediction. The price prediction technology is particularly well adapted to situations where a set of characteristics about the auction, item for sale and/or seller are known. Even when a limited set of historical auction data is available or the data is loosely structured, the price prediction can proceed without substantial loss accuracy. With meaningful auction result prediction, some of the risks of offering an item for sale at auction may be reduced, attracting more buyers and sellers to the marketplace and increasing the value of the marketplace. Having access to the likely end-price of auction items opens up a wide variety of services that can be offered to both buyers, sellers, and third parties in online auctions.

In one implementation, the historical auction data 114 may encompass three major categories of historical data: similar auctions, similar standard auctions, and "No Close" auctions. The similar auction data and similar standard auction data may each include four sub-categories: historical counts, historical starting price information, historical closing price information, and historical shipping amount information. The Tables below give examples of each type of historical auction data 114.

Tables of item, auction, and participant characteristics, both collected and derived, are given below. Table 1.0 shows exemplary collected auction characteristics. Table 2.0 shows exemplary derived auction characteristics for a PDA. Tables 3.0, 4.0, 5.0 and 6.0 show exemplary derived similar auction historical data. Tables 7.0, 8.0, 9.0 and 10.0 show exemplary derived similar standard auction historical data. Table 11.0 shows an exemplary set of derived "No close" auction historical data.

TABLE 1.0

Collected Characteristics

| Characteristic | Description |
|---|---|
| ITEMNUMBER | The online marketplace identifier for an auction |
| TITLE | Auction title |
| SELLERID | The seller's online marketplace user ID |
| SELLERRATING | Seller rating, e.g., assigned by the online marketplace based on feedback received by other online marketplace users |
| SELLERHASMEPAGE | Indicates the seller has a introductory/bio webpage on the online marketplace website |
| SELLERISPOWERSELLER | Indicates a seller has a large number of successful sales |
| FIRSTBID | The minimum price for the auction |
| HIGHBID | The closing price of the auction |
| ACCEPTSPAYMENTSERVICE | Indicates the seller accepts payments through a secure third party payment service |
| ISDUTCH | Indicates the auction is set up as a Dutch auction |
| ISRESERVE | Indicates the seller set up a reserve price for the auction |
| ISRESERVEMET | Indicates that the closing price exceeded the reserve price set by the seller |
| QUANTITYAVAILABLE | Indicates the number of items available |
| TOTALBIDS | The total number of bids placed on the item during the course of the auction |
| HIGHBIDDERID | The winning bidder's online marketplace user ID |
| STARTDATE | The beginning date and time of the auction |
| ENDDATE | The ending date and time of the auction |
| ISCOMPLETE | Indicates the auction ended at the set date/time without being cancelled by the seller |
| ISFIXEDPRICE | Indicates the seller set up a "Buy it now" price for immediate sale of the item |
| SELLERHASSHADES | Indicates that the seller has recently changed their email and billing information |
| CATEGORY | The identifying number for the primary item category chosen for the auction |
| BUYITNOWUSED | Indicates the item was purchased using the "Buy it now" feature |
| ISGIFT | Indicates the seller has chosen to add a gift box icon to the listing to indicate the item would be a good gift |
| SUBTITLE | Subtitle text if specified by seller |
| CATEGORY2 | The identifying number for a secondary item category for the auction |
| SHIPPINGAMOUNT | The shipping amount to be paid by the buyer |
| PREFERSTHIRDPARTYPAYMENT | Indicates the seller's preferred method of payment is through a third party payment service. |
| POSITIVEFEEDBACKPERCENT | The percent of positive feedback (of all the feedback) received by the seller |
| HASPICTURE | Indicates the seller included a picture with the listing |
| MEMBERSINCE | The date the seller created their online marketplace user account |
| HASEBAYSTORE | Indicates the seller has an online retail page on the online site |

TABLE 2.0

Derived PDA Characteristics

| Characteristic | Description |
|---|---|
| NEW | Indicates the existence of the word "new" in the title |
| BROKEN | Indicates the existence of the word "broken" in the title |
| LIKENEW | Indicates the existence of the phrase "like new" in the title |
| SEALED | Indicates the existence of the word "sealed" in the title |
| MANUFACTURER | The item manufacturer, extracted from the title |
| SCREEN | The item screen features, extracted from the title |
| MODEL | The item model, extracted from the title |
| MEMORY | The item memory features, extracted from the title |
| FEATURES | Other item features, extracted from the title |
| STARTDAY | The day of the week (number) that the auction started |
| STARTDAYTEXT | The day of the week (text) that the auction started |
| ENDDAY | The day of the week (number) that the auction ended |
| ENDDAYTEXT | The day of the week (text) that the auction ended |
| AUCTIONLENGTH | The number of days that the auction lasted |
| BUYERPAYS | Contains "true" if buyer pays for shipping, "false" if seller pays |
| FREESHIPPING | Contains "true" if shipping is free to the buyer |
| SEARCHDESCRIPTIONFORSHIPPING | Indicates that the shipping amount was not specified in its designated place (ShippingAmount field) and a search was done in the description text to get the price |
| SHIPPINGCHARGE | The ShippingAmount or the amount found in the description text search |

TABLE 3.0

Similar Auction Counts

| | |
|---|---|
| COUNT_CURRENT | Count of similar item auctions open when the specified auction started |
| COUNT_IN_5MI | Count of similar item auctions ending 5 minutes before the specified auction started |
| COUNT_IN_30MI | Count of similar item auctions end in 30 minutes before the specified auction started |
| COUNT_IN_1HR | Count of similar item auctions ending 1 hour before the specified auction started |
| COUNT_IN_2HR | Count of similar item auctions ending 2 hours before the specified auction started |
| COUNT_IN_4HR | Count of similar item auctions ending 4 hours before the specified auction started |
| COUNT_IN_8HR | Count of similar item auctions ending 8 hours before the specified auction started |

TABLE 3.0-continued

Similar Auction Counts

| | |
|---|---|
| COUNT_IN_12HR | Count of similar item auctions ending 12 hours before the specified auction started |
| COUNT_IN_24HR | Count of similar item auctions ending 1 day before the specified auction started |
| COUNT_IN_48HR | Count of similar item auctions ending 2 days before the specified auction started |
| COUNT_IN_60HR | Count of similar item auctions ending 2.5 days before the specified auction started |
| COUNT_IN_240HR | Count of similar item auctions ending 10 days before the specified auction started |
| COUNT_ALL | Count of similar item auctions (in stored history) ending before the specified auction started |

TABLE 4.0

Similar Auction Closing Price Information

| | |
|---|---|
| MAX_CP_CURRENT | Maximum closing price of similar item auctions open when the specified auction started |
| MIN_CP_CURRENT | Minimum closing price of similar item auctions open when the specified auction started |
| AVG_CP_CURRENT | Average closing price of similar item auctions open when the specified auction started |
| STD_CP_CURRENT | Standard deviation of the closing prices of similar item auctions open when the specified auction started |
| MAX_CP_IN_5MI | Maximum closing price of similar item auctions ending 5 minutes before the specified auction started |
| MIN_CP_IN_5MI | Minimum closing price of similar item auctions ending 5 minutes before the specified auction started |
| AVG_CP_IN_5MI | Average closing price of similar item auctions ending 5 minutes before the specified auction started |
| STD_CP_IN_5MI | Std. Dev. of the closing prices of similar item auctions ending 5 minutes before the specified auction started |
| MAX_CP_IN_30MI | Maximum closing price of similar item auctions ending 30 minutes before the specified auction started |
| MIN_CP_IN_30MI | Minimum closing price of similar item auctions ending 30 minutes before the specified auction started |
| AVG_CP_IN_30MI | Average closing price of similar item auctions ending 30 minutes before the specified auction started |
| STD_CP_IN_30MI | Std. Dev. of the closing prices of similar item auctions ending 30 minutes before the specified auction started |
| MAX_CP_IN_1HR | Maximum closing price of similar item auctions ending 1 hour before the specified auction started |
| MIN_CP_IN_1HR | Minimum closing price of similar item auctions ending 1hour before the specified auction started |
| AVG_CP_IN_1HR | Average closing price of similar item auctions ending 1 hour before the specified auction started |
| STD_CP_IN_1HR | Std. Dev. of the closing prices of similar item auctions ending 1 hour before the specified auction started |
| MAX_CP_IN_2HR | Maximum closing price of similar item auctions ending 2 hours before the specified auction started |
| MIN_CP_IN_2HR | Minimum closing price of similar item auctions ending 2 hours before the specified auction started |
| AVG_CP_IN_2HR | Average closing price of similar item auctions ending 2 hours before the specified auction started |
| STD_CP_IN_2HR | Std. Dev. of the closing prices of similar item auctions ending 2 hours before the |

TABLE 4.0-continued

Similar Auction Closing Price Information

| | |
|---|---|
| | specified auction started |
| MAX_CP_IN_4HR | Maximum closing price of similar item auctions ending 4 hours before the specified auction started |
| MIN_CP_IN_4HR | Minimum closing price of similar item auctions ending 4 hours before the specified auction started |
| AVG_CP_IN_4HR | Average closing price of similar item auctions ending 4 hours before the specified auction started |
| STD_CP_IN_4HR | Std. Dev. of the closing prices of similar item auctions ending 4 hours before the specified auction started |
| MAX_CP_IN_8HR | Maximum closing price of similar item auctions ending 8 hours before the specified auction started |
| MIN_CP_IN_8HR | Minimum closing price of similar item auctions ending 8 hours before the specified auction started |
| AVG_CP_IN_8HR | Average closing price of similar item auctions ending 8 hours before the specified auction started |
| STD_CP_IN_8HR | Std. Dev. of the closing prices of similar item auctions ending 8 hours before the specified auction started |
| MAX_CP_IN_12HR | Maximum closing price of similar item auctions ending 12 hours before the specified auction started |
| MIN_CP_IN_12HR | Minimum closing price of similar item auctions ending 12 hours before the specified auction started |
| AVG_CP_IN_12HR | Average closing price of similar item auctions ending 12 hours before the specified auction started |
| STD_CP_IN_12HR | Std. Dev. of the closing prices of similar item auctions ending 12 hours before the specified auction started |
| MAX_CP_IN_24HR | Maximum closing price of similar item auctions ending 1 day before the specified auction started |
| MIN_CP_IN_24HR | Minimum closing price of similar item auctions ending 1 day before the specified auction started |
| AVG_CP_IN_24HR | Average closing price of similar item auctions ending 1 day before the specified auction started |
| STD_CP_IN_24HR | Std. Dev. of the closing prices of similar item auctions ending 1 day before the specified auction started |
| MAX_CP_IN_48HR | Maximum closing price of similar item auctions ending 2 days before the specified auction started |
| MIN_CP_IN_48HR | Minimum closing price of similar item auctions ending 2 days before the specified auction started |
| AVG_CP_IN_48HR | Average closing price of similar item auctions ending 2 days before the specified auction started |
| STD_CP_IN_48HR | Std. Dev. of the closing prices of similar item auctions ending 2 days before the specified auction started |
| MAX_CP_IN_60HR | Maximum closing price of similar item auctions ending 2.5 days before the specified auction started |
| MIN_CP_IN_60HR | Minimum closing price of similar item auctions ending 2.5 days before the specified auction started |
| AVG_CP_IN_60HR | Average closing price of similar item auctions ending 2.5 days before the specified auction started |
| STD_CP_IN_60HR | Std. Dev. of the closing prices of similar item auctions ending 2.5 days before the specified auction started |
| MAX_CP_IN_240HR | Maximum closing price of similar item auctions ending 10 days before the specified auction started |
| MIN_CP_IN_240HR | Minimum closing price of similar item auctions |

TABLE 4.0-continued

Similar Auction Closing Price Information

| | |
|---|---|
| | ending 10 days before the specified auction started |
| AVG_CP_IN_240HR | Average closing price of similar item auctions ending 10 days before the specified auction started |
| STD_CP_IN_240HR | Std. Dev. of the closing prices of similar item auctions ending 10 days before the specified auction started |
| MAX_CP_ALL | Maximum closing price of similar item auctions (in stored history) ending before the specified auction started |
| MIN_CP_ALL | Minimum closing price of similar item auctions (in stored history) ending before the specified auction started |
| AVG_CP_ALL | Average closing price of similar item auctions (in stored history) ending before the specified auction started |
| STD_CP_ALL | Std. Dev. of the closing prices of similar item auctions (in stored history) ending before the specified auction started |

TABLE 5.0

Similar Auction Starting Price Information

| | |
|---|---|
| MAX_SP_CURRENT | Maximum starting price of similar item auctions open when the specified auction started |
| MIN_SP_CURRENT | Minimum starting price of similar item auctions open when the specified auction started |
| AVG_SP_CURRENT | Average starting price of similar item auctions open when the specified auction started |
| STD_SP_CURRENT | Standard deviation of the starting prices of similar item auctions open when the specified auction started |
| MAX_SP_IN_5MI | Maximum starting price of similar item auctions ending 5 minutes before the specified auction started |
| MIN_SP_IN_5MI | Minimum starting price of similar item auctions ending 5 minutes before the specified auction started |
| AVG_SP_IN_5MI | Average starting price of similar item auctions ending 5 minutes before the specified auction started |
| STD_SP_IN_5MI | Std. Dev. of the starting prices of similar item auctions ending 5 minutes before the specified auction started |
| MAX_SP_IN_30MI | Maximum starting price of similar item auctions ending 30 minutes before the specified auction started |
| MIN_SP_IN_30MI | Minimum starting price of similar item auctions ending 30 minutes before the specified auction started |
| AVG_SP_IN_30MI | Average starting price of similar item auctions ending 30 minutes before the specified auction started |
| STD_SP_IN_30MI | Std. Dev. of the starting prices of similar item auctions ending 30 minutes before the specified auction started |
| MAX_SP_IN_1HR | Maximum starting price of similar item auctions ending 1 hour before the specified auction started |
| MIN_SP_IN_1HR | Minimum starting price of similar item auctions ending 1 hour before the specified auction started |
| AVG_SP_IN_1HR | Average starting price of similar item auctions ending 1 hour before the specified auction started |
| STD_SP_IN_1HR | Std. Dev. of the starting prices of similar item auctions ending 1 hour before the specified auction started |
| MAX_SP_IN_2HR | Maximum starting price of similar item auctions ending 2 hours before the specified auction started |

TABLE 5.0-continued

Similar Auction Starting Price Information

| | |
|---|---|
| MIN_SP_IN_2HR | Minimum starting price of similar item auctions ending 2 hours before the specified auction started |
| AVG_SP_IN_2HR | Average starting price of similar item auctions ending 2 hours before the specified auction started |
| STD_SP_IN_2HR | Std. Dev. of the starting prices of similar item auctions ending 2 hours before the specified auction started |
| MAX_SP_IN_4HR | Maximum starting price of similar item auctions ending 4 hours before the specified auction started |
| MIN_SP_IN_4HR | Minimum starting price of similar item auctions ending 4 hours before the specified auction started |
| AVG_SP_IN_4HR | Average starting price of similar item auctions ending 4 hours before the specified auction started |
| STD_SP_IN_4HR | Std. Dev. of the starting prices of similar item auctions ending 4 hours before the specified auction started |
| MAX_SP_IN_8HR | Maximum starting price of similar item auctions ending 8 hours before the specified auction started |
| MIN_SP_IN_8HR | Minimum starting price of similar item auctions ending 8 hours before the specified auction started |
| AVG_SP_IN_8HR | Average starting price of similar item auctions ending 8 hours before the specified auction started |
| STD_SP_IN_8HR | Std. Dev. of the starting prices of similar item auctions ending 8 hours before the specified auction started |
| MAX_SP_IN_12HR | Maximum starting price of similar item auctions ending 12 hours before the specified auction started |
| MIN_SP_IN_12HR | Minimum starting price of similar item auctions ending 12 hours before the specified auction started |
| AVG_SP_IN_12HR | Average starting price of similar item auctions ending 12 hours before the specified auction started |
| STD_SP_IN_12HR | Std. Dev. of the starting prices of similar item auctions ending 12 hours before the specified auction started |
| MAX_SP_IN_24HR | Maximum starting price of similar item auctions ending 1 day before the specified auction started |
| MIN_SP_IN_24HR | Minimum starting price of similar item auctions ending 1 day before the specified auction started |
| AVG_SP_IN_24HR | Average starting price of similar item auctions ending 1 day before the specified auction started |
| STD_SP_IN_24HR | Std. Dev. of the starting prices of similar item auctions ending 1 day before the specified auction started |
| MAX_SP_IN_48HR | Maximum starting price of similar item auctions ending 2 days before the specified auction started |
| MIN_SP_IN_48HR | Minimum starting price of similar item auctions ending 2 days before the specified auction started |
| AVG_SP_IN_48HR | Average starting price of similar item auctions ending 2 days before the specified auction started |
| STD_SP_IN_48HR | Std. Dev. of the starting prices of similar item auctions ending 2 days before the specified auction started |
| MAX_SP_IN_60HR | Maximum starting price of similar item auctions ending 2.5 days before the specified auction started |
| MIN_SP_IN_60HR | Minimum starting price of similar item auctions ending 2.5 days before the specified auction started |
| AVG_SP_IN_60HR | Average starting price of similar item auctions ending 2.5 days before the specified auction |

TABLE 5.0-continued

Similar Auction Starting Price Information

| | |
|---|---|
| | started |
| STD_SP_IN_60HR | Std. Dev. of the starting prices of similar item auctions ending 2.5 days before the specified auction started |
| MAX_SP_IN_240HR | Maximum starting price of similar item auctions ending 10 days before the specified auction started |
| MIN_SP_IN_240HR | Minimum starting price of similar item auctions ending 10 days before the specified auction started |
| AVG_SP_IN_240HR | Average starting price of similar item auctions ending 10 days before the specified auction started |
| STD_SP_IN_240HR | Std. Dev. of the starting prices of similar item auctions ending 10 days before the specified auction started |
| MAX_SP_ALL | Maximum starting price of similar item auctions (in stored history) ending before the specified auction started |
| MIN_SP_ALL | Minimum starting price of similar item auctions (in stored history) ending before the specified auction started |
| AVG_SP_ALL | Average starting price of similar item auctions (in stored history) ending before the specified auction started |
| STD_SP_ALL | Std. Dev. of the starting prices of similar item auctions (in stored history) ending before the specified auction started |

TABLE 6.0

Similar Auction Shipping Information

| | |
|---|---|
| MAX_SA_CURRENT | Maximum shipping amount of similar item auctions open when the specified auction started |
| MIN_SA_CURRENT | Minimum shipping amount of similar item auctions open when the specified auction started |
| AVG_SA_CURRENT | Average shipping amount of similar item auctions open when the specified auction started |
| STD_SA_CURRENT | Standard deviation of the shipping amounts of similar item auctions open when the specified auction started |
| MAX_SA_IN_5MI | Maximum shipping amount of similar item auctions ending 5 minutes before the specified auction started |
| MIN_SA_IN_5MI | Minimum shipping amount of similar item auctions ending 5 minutes before the specified auction started |
| AVG_SA_IN_5MI | Average shipping amount of similar item auctions ending 5 minutes before the specified auction started |
| STD_SA_IN_5MI | Std. Dev. of the shipping amounts of similar item auctions ending 5 minutes before the specified auction started |
| MAX_SA_IN_30MI | Maximum shipping amount of similar item auctions ending 30 minutes before the specified auction started |
| MIN_SA_IN_30MI | Minimum shipping amount of similar item auctions ending 30 minutes before the specified auction started |
| AVG_SA_IN_30MI | Average shipping amount of similar item auctions ending 30 minutes before the specified auction started |
| STD_SA_IN_30MI | Std. Dev. of the shipping amounts of similar item auctions ending 30 minutes before the specified auction started |
| MAX_SA_IN_1HR | Maximum shipping amount of similar item auctions ending 1 hour before the specified auction started |
| MIN_SA_IN_1HR | Minimum shipping amount of similar item auctions ending 1 hour before the specified auction started |

TABLE 6.0-continued

Similar Auction Shipping Information

| | |
|---|---|
| AVG_SA_IN_1HR | Average shipping amount of similar item auctions ending 1 hour before the specified auction started |
| STD_SA_IN_1HR | Std. Dev. of the shipping amounts of similar item auctions ending 1 hour before the specified auction started |
| MAX_SA_IN_2HR | Maximum shipping amount of similar item auctions ending 2 hours before the specified auction started |
| MIN_SA_IN_2HR | Minimum shipping amount of similar item auctions ending 2 hours before the specified auction started |
| AVG_SA_IN_2HR | Average shipping amount of similar item auctions ending 2 hours before the specified auction started |
| STD_SA_IN_2HR | Std. Dev. of the shipping amounts of similar item auctions ending 2 hours before the specified auction started |
| MAX_SA_IN_4HR | Maximum shipping amount of similar item auctions ending 4 hours before the specified auction started |
| MIN_SA_IN_4HR | Minimum shipping amount of similar item auctions ending 4 hours before the specified auction started |
| AVG_SA_IN_4HR | Average shipping amount of similar item auctions ending 4 hours before the specified auction started |
| STD_SA_IN_4HR | Std. Dev. of the shipping amounts of similar item auctions ending 4 hours before the specified auction started |
| MAX_SA_IN_8HR | Maximum shipping amount of similar item auctions ending 8 hours before the specified auction started |
| MIN_SA_IN_8HR | Minimum shipping amount of similar item auctions ending 8 hours before the specified auction started |
| AVG_SA_IN_8HR | Average shipping amount of similar item auctions ending 8 hours before the specified auction started |
| STD_SA_IN_8HR | Std. Dev. of the shipping amounts of similar item auctions ending 8 hours before the specified auction started |
| MAX_SA_IN_12HR | Maximum shipping amount of similar item auctions ending 12 hours before the specified auction started |
| MIN_SA_IN_12HR | Minimum shipping amount of similar item auctions ending 12 hours before the specified auction started |
| AVG_SA_IN_12HR | Average shipping amount of similar item auctions ending 12 hours before the specified auction started |
| STD_SA_IN_12HR | Std. Dev. of the shipping amounts of similar item auctions ending 12 hours before the specified auction started |
| MAX_SA_IN_24HR | Maximum shipping amount of similar item auctions ending 1 day before the specified auction started |
| MIN_SA_IN_24HR | Minimum shipping amount of similar item auctions ending 1 day before the specified auction started |
| AVG_SA_IN_24HR | Average shipping amount of similar item auctions ending 1 day before the specified auction started |
| STD_SA_IN_24HR | Std. Dev. of the shipping amounts of similar item auctions ending 1 day before the specified auction started |
| MAX_SA_IN_48HR | Maximum shipping amount of similar item auctions ending 2 days before the specified auction started |
| MIN_SA_IN_48HR | Minimum shipping amount of similar item auctions ending 2 days before the specified auction started |
| AVG_SA_IN_48HR | Average shipping amount of similar item auctions ending 2 days before the specified auction started |
| STD_SA_IN_48HR | Std. Dev. of the shipping amounts of similar |

TABLE 6.0-continued

Similar Auction Shipping Information

| | |
|---|---|
| | item auctions ending 2 days before the specified auction started |
| MAX_SA_IN_60HR | Maximum shipping amount of similar item auctions ending 2.5 days before the specified auction started |
| MIN_SA_IN_60HR | Minimum shipping amount of similar item auctions ending 2.5 days before the specified auction started |
| AVG_SA_IN_60HR | Average shipping amount of similar item auctions ending 2.5 days before the specified auction started |
| STD_SA_IN_60HR | Std. Dev. of the shipping amounts of similar item auctions ending 2.5 days before the specified auction started |
| MAX_SA_IN_240HR | Maximum shipping amount of similar item auctions ending 10 days before the specified auction started |
| MIN_SA_IN_240HR | Minimum shipping amount of similar item auctions ending 10 days before the specified auction started |
| AVG_SA_IN_240HR | Average shipping amount of similar item auctions ending 10 days before the specified auction started |
| STD_SA_IN_240HR | Std. Dev. of the shipping amounts of similar item auctions ending 10 days before the specified auction started |
| MAX_SA_ALL | Maximum shipping amount of similar item auctions (in stored history) ending before the specified auction started |
| MIN_SA_ALL | Minimum shipping amount of similar item auctions (in stored history) ending before the specified auction started |
| AVG_SA_ALL | Average shipping amount of similar item auctions (in stored history) ending before the specified auction started |
| STD_SA_ALL | Std. Dev. of the shipping amounts of similar item auctions (in stored history) ending before the specified auction started |

TABLE 7.0

Similar Standard Auction Counts

| | |
|---|---|
| F_COUNT_CURRENT | Count of similar standard item auctions open when the specified auction started |
| F_COUNT_IN_5MI | Count of similar standard item auctions ending 5 minutes before the specified auction started |
| F_COUNT_IN_30MI | Count of similar standard item auctions ending 30 minutes before the specified auction started |
| F_COUNT_IN_1HR | Count of similar standard item auctions ending 1 hour before the specified auction started |
| F_COUNT_IN_2HR | Count of similar standard item auctions ending 2 hours before the specified auction started |
| F_COUNT_IN_4HR | Count of similar standard item auctions ending 4 hours before the specified auction started |
| F_COUNT_IN_8HR | Count of similar standard item auctions ending 8 hours before the specified auction started |
| F_COUNT_IN_12HR | Count of similar standard item auctions ending 12 hours before the specified auction started |
| F_COUNT_IN_24HR | Count of similar standard item auctions ending 1 day before the specified auction started |
| F_COUNT_IN_48HR | Count of similar standard item auctions ending 2 days before the specified auction started |
| F_COUNT_IN_60HR | Count of similar standard item auctions ending 2.5 days before the specified auction started |
| F_COUNT_IN_240HR | Count of similar standard item auctions ending 10 days before the specified auction started |
| F_COUNT_ALL | Count of similar standard item auctions (in stored history) ending before the specified auction started |

TABLE 8.0

Similar Standard Auction Closing Price Information

| | |
|---|---|
| F_MAX_SP_CURRENT | Maximum closing price of similar standard item auctions open when the specified auction started |
| F_MIN_SP_CURRENT | Minimum closing price of similar standard item auctions open when the specified auction started |
| F_AVG_SP_CURRENT | Average closing price of similar standard item auctions open when the specified auction started |
| F_STD_SP_CURRENT | Standard deviation of the closing prices of similar standard item auctions open when the specified auction started |
| F_MAX_SP_IN_5MI | Maximum closing price of similar standard item auctions ending 5 minutes before the specified auction started |
| F_MIN_SP_IN_5MI | Minimum closing price of similar standard item auctions ending 5 minutes before the specified auction started |
| F_AVG_SP_IN_5MI | Average closing price of similar standard item auctions ending 5 minutes before the specified auction started |
| F_STD_SP_IN_5MI | Std. Dev. of the closing prices of similar standard item auctions ending 5 minutes before the specified auction started |
| F_MAX_SP_IN_30MI | Maximum closing price of similar standard item auctions ending 30 minutes before the specified auction started |
| F_MIN_SP_IN_30MI | Minimum closing price of similar standard item auctions ending 30 minutes before the specified auction started |
| F_AVG_SP_IN_30MI | Average closing price of similar standard item auctions ending 30 minutes before the specified auction started |
| F_STD_SP_IN_30MI | Std. Dev. of the closing prices of similar standard item auctions ending 30 minutes before the specified auction started |
| F_MAX_SP_IN_1HR | Maximum closing price of similar standard item auctions ending 1 hour before the specified auction started |
| F_MIN_SP_IN_1HR | Minimum closing price of similar standard item auctions ending 1 hour before the specified auction started |
| F_AVG_SP_IN_1HR | Average closing price of similar standard item auctions ending 1 hour before the specified auction started |
| F_STD_SP_IN_1HR | Std. Dev. of the closing prices of similar standard item auctions ending 1 hour before the specified auction started |
| F_MAX_SP_IN_2HR | Maximum closing price of similar standard item auctions ending 2 hours before the specified auction started |
| F_MIN_SP_IN_2HR | Minimum closing price of similar standard item auctions ending 2 hours before the specified auction started |
| F_AVG_SP_IN_2HR | Average closing price of similar standard item auctions ending 2 hours before the specified auction started |
| F_STD_SP_IN_2HR | Std. Dev. of the closing prices of similar standard item auctions ending 2 hours before the specified auction started |
| F_MAX_SP_IN_4HR | Maximum closing price of similar standard item auctions ending 4 hours before the specified auction started |
| F_MIN_SP_IN_4HR | Minimum closing price of similar standard item auctions ending 4 hours before the specified auction started |
| F_AVG_SP_IN_4HR | Average closing price of similar standard item auctions ending 4 hours before the specified auction started |
| F_STD_SP_IN_4HR | Std. Dev. of the closing prices of similar standard item auctions ending 4 hours before the specified auction started |
| F_MAX_SP_IN_8HR | Maximum closing price of similar standard item auctions ending 8 hours before the specified auction started |
| F_MIN_SP_IN_8HR | Minimum closing price of similar standard item auctions ending 8 hours before the |

TABLE 8.0-continued

Similar Standard Auction Closing Price Information

| | |
|---|---|
| | specified auction started |
| F_AVG_SP_IN_8HR | Average closing price of similar standard item auctions ending 8 hours before the specified auction started |
| F_STD_SP_IN_8HR | Std. Dev. of the closing prices of similar standard item auctions ending 8 hours before the specified auction started |
| F_MAX_SP_IN_12HR | Maximum closing price of similar standard item auctions ending 12 hours before the specified auction started |
| F_MIN_SP_IN_12HR | Minimum closing price of similar standard item auctions ending 12 hours before the specified auction started |
| F_AVG_SP_IN_12HR | Average closing price of similar standard item auctions ending 12 hours before the specified auction started |
| F_STD_SP_IN_12HR | Std. Dev. of the closing prices of similar standard item auctions ending 12 hours before the specified auction started |
| F_MAX_SP_IN_24HR | Maximum closing price of similar standard item auctions ending 1 day before the specified auction started |
| F_MIN_SP_IN_24HR | Minimum closing price of similar standard item auctions ending 1 day before the specified auction started |
| F_AVG_SP_IN_24HR | Average closing price of similar standard item auctions ending 1 day before the specified auction started |
| F_STD_SP_IN_24HR | Std. Dev. of the closing prices of similar standard item auctions ending 1 day before the specified auction started |
| F_MAX_SP_IN_48HR | Maximum closing price of similar standard item auctions ending 2 days before the specified auction started |
| F_MIN_SP_IN_48HR | Minimum closing price of similar standard item auctions ending 2 days before the specified auction started |
| F_AVG_SP_IN_48HR | Average closing price of similar standard item auctions ending 2 days before the specified auction started |
| F_STD_SP_IN_48HR | Std. Dev. of the closing prices of similar standard item auctions ending 2 days before the specified auction started |
| F_MAX_SP_IN_60HR | Maximum closing price of similar standard item auctions ending 2.5 days before the specified auction started |
| F_MIN_SP_IN_60HR | Minimum closing price of similar standard item auctions ending 2.5 days before the specified auction started |
| F_AVG_SP_IN_60HR | Average closing price of similar standard item auctions ending 2.5 days before the specified auction started |
| F_STD_SP_IN_60HR | Std. Dev. of the closing prices of similar standard item auctions ending 2.5 days before the specified auction started |
| F_MAX_SP_IN_240HR | Maximum closing price of similar standard item auctions ending 10 days before the specified auction started |
| F_MIN_SP_IN_240HR | Minimum closing price of similar standard item auctions ending 10 days before the specified auction started |
| F_AVG_SP_IN_240HR | Average closing price of similar standard item auctions ending 10 days before the specified auction started |
| F_STD_SP_IN_240HR | Std. Dev. of the closing prices of similar standard item auctions ending 10 days before the specified auction started |
| F_MAX_SP_ALL | Maximum closing price of similar standard item auctions (in stored history) ending before the specified auction started |
| F_MIN_SP_ALL | Minimum closing price of similar standard item auctions (in stored history) ending before the specified auction started |
| F_AVG_SP_ALL | Average closing price of similar standard item auctions (in stored history) ending before the specified auction started |
| F_STD_SP_ALL | Std. Dev. of the closing prices of similar standard item auctions (in stored history) ending before the specified auction started |

TABLE 9.0

Similar Standard Auction Starting Price Information

| | |
|---|---|
| F_MAX_SA_CURRENT | Maximum starting price of similar standard item auctions open when the specified auction started |
| F_MIN_SA_CURRENT | Minimum starting price of similar standard item auctions open when the specified auction started |
| F_AVG_SA_CURRENT | Average starting price of similar standard item auctions open when the specified auction started |
| F_STD_SA_CURRENT | Standard deviation of the starting prices of similar standard item auctions open when the specified auction started |
| F_MAX_SA_IN_5MI | Maximum starting price of similar standard item auctions ending 5 minutes before the specified auction started |
| F_MIN_SA_IN_5MI | Minimum starting price of similar standard item auctions ending 5 minutes before the specified auction started |
| F_AVG_SA_IN_5MI | Average starting price of similar standard item auctions ending 5 minutes before the specified auction started |
| F_STD_SA_IN_5MI | Std. Dev. of the starting prices of similar standard item auctions ending 5 minutes before the specified auction started |
| F_MAX_SA_IN_30MI | Maximum starting price of similar standard item auctions ending 30 minutes before the specified auction started |
| F_MIN_SA_IN_30MI | Minimum starting price of similar standard item auctions ending 30 minutes before the specified auction started |
| F_AVG_SA_IN_30MI | Average starting price of similar standard item auctions ending 30 minutes before the specified auction started |
| F_STD_SA_IN_30MI | Std. Dev. of the starting prices of similar standard item auctions ending 30 minutes before the specified auction started |
| F_MAX_SA_IN_1HR | Maximum starting price of similar standard item auctions ending 1 hour before the specified auction started |
| F_MIN_SA_IN_1HR | Minimum starting price of similar standard item auctions ending 1hour before the specified auction started |
| F_AVG_SA_IN_1HR | Average starting price of similar standard item auctions ending 1 hour before the specified auction started |
| F_STD_SA_IN_1HR | Std. Dev. of the starting prices of similar standard item auctions ending 1 hour before the specified auction started |
| F_MAX_SA_IN_2HR | Maximum starting price of similar standard item auctions ending 2 hour before the specified auction started |
| F_MIN_SA_IN_2HR | Minimum starting price of similar standard item auctions ending 2 hours before the specified auction started |
| F_AVG_SA_IN_2HR | Average starting price of similar standard item auctions ending 2 hours before the specified auction started |
| F_STD_SA_IN_2HR | Std. Dev. of the starting prices of similar standard item auctions ending 2 hours before the specified auction started |
| F_MAX_SA_IN_4HR | Maximum starting price of similar standard item auctions ending 4 hours before the specified auction started |
| F_MIN_SA_IN_4HR | Minimum starting price of similar standard item auctions ending 4 hours before the specified auction started |
| F_AVG_SA_IN_4HR | Average starting price of similar standard |

TABLE 9.0-continued

Similar Standard Auction Starting Price Information

| | |
|---|---|
| | item auctions ending 4 hours before the specified auction started |
| F_STD_SA_IN_4HR | Std. Dev. of the starting prices of similar standard item auctions ending 4 hours before the specified auction started |
| F_MAX_SA_IN_8HR | Maximum starting price of similar standard item auctions ending 8 hours before the specified auction started |
| F_MIN_SA_IN_8HR | Minimum starting price of similar standard item auctions ending 8 hours before the specified auction started |
| F_AVG_SA_IN_8HR | Average starting price of similar standard item auctions ending 8 hours before the specified auction started |
| F_STD_SA_IN_8HR | Std. Dev. of the starting prices of similar standard item auctions ending 8 hours before the specified auction started |
| F_MAX_SA_IN_12HR | Maximum starting price of similar standard item auctions ending 12 hours before the specified auction started |
| F_MIN_SA_IN_12HR | Minimum starting price of similar standard item auctions ending 12 hours before the specified auction started |
| F_AVG_SA_IN_12HR | Average starting price of similar standard item auctions ending 12 hours before the specified auction started |
| F_STD_SA_IN_12HR | Std. Dev. of the starting prices of similar standard item auctions ending 12 hours before the specified auction started |
| F_MAX_SA_IN_24HR | Maximum starting price of similar standard item auctions ending 1 day before the specified auction started |
| F_MIN_SA_IN_24HR | Minimum starting price of similar standard item auctions ending 1 day before the specified auction started |
| F_AVG_SA_IN_24HR | Average starting price of similar standard item auctions ending 1 day before the specified auction started |
| F_STD_SA_IN_24HR | Std. Dev. of the starting prices of similar standard item auctions ending 1 day before the specified auction started |
| F_MAX_SA_IN_48HR | Maximum starting price of similar standard item auctions ending 2 days before the specified auction started |
| F_MIN_SA_IN_48HR | Minimum starting price of similar standard item auctions ending 2 days before the specified auction started |
| F_AVG_SA_IN_48HR | Average starting price of similar standard item auctions ending 2 days before the specified auction started |
| F_STD_SA_IN_48HR | Std. Dev. of the starting prices of similar standard item auctions ending 2 days before the specified auction started |
| F_MAX_SA_IN_60HR | Maximum starting price of similar standard item auctions ending 2.5 days before the specified auction started |
| F_MIN_SA_IN_60HR | Minimum starting price of similar standard item auctions ending 2.5 days before the specified auction started |
| F_AVG_SA_IN_60HR | Average starting price of similar standard item auctions ending 2.5 days before the specified auction started |
| F_STD_SA_IN_60HR | Std. Dev. of the starting prices of similar standard item auctions ending 2.5 days before the specified auction started |
| F_MAX_SA_IN_240HR | Maximum starting price of similar standard item auctions ending 10 days before the specified auction started |
| F_MIN_SA_IN_240HR | Minimum starting price of similar standard item auctions ending 10 days before the specified auction started |
| F_AVG_SA_IN_240HR | Average starting price of similar standard item auctions ending 10 days before the specified auction started |
| F_STD_SA_IN_240HR | Std. Dev. of the starting prices of similar standard item auctions ending 10 days before the specified auction started |
| F_MAX_SA_ALL | Maximum starting price of similar standard item auctions (in stored history) ending before the specified auction started |
| F_MIN_SA_ALL | Minimum starting price of similar standard item auctions (in stored history) ending before the specified auction started |
| F_AVG_SA_ALL | Average starting price of similar standard item auctions (in stored history) ending before the specified auction started |
| F_STD_SA_ALL | Std. Dev. of the starting prices of similar standard item auctions (in stored history) ending before the specified auction started |

TABLE 10.0

Similar Standard Auction Shipping Amount Information

| | |
|---|---|
| F_MAX_CP_CURRENT | Maximum shipping amount of similar standard item auctions open when the specified auction started |
| F_MIN_CP_CURRENT | Minimum shipping amount of similar standard item auctions open when the specified auction started |
| F_AVG_CP_CURRENT | Average shipping amount of similar standard item auctions open when the specified auction started |
| F_STD_CP_CURRENT | Standard deviation of the shipping amounts of similar standard item auctions open when the specified auction started |
| F_MAX_CP_IN_5MI | Maximum shipping amount of similar standard item auctions ending 5 minutes before the specified auction started |
| F_MIN_CP_IN_5MI | Minimum shipping amount of similar standard item auctions ending 5 minutes before the specified auction started |
| F_AVG_CP_IN_5MI | Average shipping amount of similar standard item auctions ending 5 minutes before the specified auction started |
| F_STD_CP_IN_5MI | Std. Dev. of the shipping amounts of similar standard item auctions ending 5 minutes before the specified auction started |
| F_MAX_CP_IN_30MI | Maximum shipping amount of similar standard item auctions ending 30 minutes before the specified auction started |
| F_MIN_CP_IN_30MI | Minimum shipping amount of similar standard item auctions ending 30 minutes before the specified auction started |
| F_AVG_CP_IN_30MI | Average shipping amount of similar standard item auctions ending 30 minutes before the specified auction started |
| F_STD_CP_IN_30MI | Std. Dev. of the shipping amounts of similar standard item auctions ending 30 minutes before the specified auction started |
| F_MAX_CP_IN_1HR | Maximum shipping amount of similar standard item auctions ending 1 hour before the specified auction started |
| F_MIN_CP_IN_1HR | Minimum shipping amount of similar standard item auctions ending 1 hour before the specified auction started |
| F_AVG_CP_IN_1HR | Average shipping amount of similar standard item auctions ending 1 hour before the specified auction started |
| F_STD_CP_IN_1HR | Std. Dev. of the shipping amounts of similar standard item auctions ending 1 hour before the specified auction started |
| F_MAX_CP_IN_2HR | Maximum shipping amount of similar standard item auctions ending 2 hours before the specified auction started |
| F_MIN_CP_IN_2HR | Minimum shipping amount of similar standard item auctions ending 2 hours before the specified auction started |
| F_AVG_CP_IN_2HR | Average shipping amount of similar standard item auctions ending 2 hours before the specified auction started |

TABLE 10.0-continued

Similar Standard Auction Shipping Amount Information

| | |
|---|---|
| F_STD_CP_IN_2HR | Std. Dev. of the shipping amounts of similar standard item auctions ending 2 hours before the specified auction started |
| F_MAX_CP_IN_4HR | Maximum shipping amount of similar standard item auctions ending 4 hours before the specified auction started |
| F_MIN_CP_IN_4HR | Minimum shipping amount of similar standard item auctions ending 4 hours before the specified auction started |
| F_AVG_CP_IN_4HR | Average shipping amount of similar standard item auctions ending 4 hours before the specified auction started |
| F_STD_CP_IN_4HR | Std. Dev. of the shipping amounts of similar standard item auctions ending 4 hours before the specified auction started |
| F_MAX_CP_IN_8HR | Maximum shipping amount of similar standard item auctions ending 8 hours before the specified auction started |
| F_MIN_CP_IN_8HR | Minimum shipping amount of similar standard item auctions ending 8 hours before the specified auction started |
| F_AVG_CP_IN_8HR | Average shipping amount of similar standard item auctions ending 8 hours before the specified auction started |
| F_STD_CP_IN_8HR | Std. Dev. of the shipping amounts of similar standard item auctions ending 8 hours before the specified auction started |
| F_MAX_CP_IN_12HR | Maximum shipping amount of similar standard item auctions ending 12 hours before the specified auction started |
| F_MIN_CP_IN_12HR | Minimum shipping amount of similar standard item auctions ending 12 hours before the specified auction started |
| F_AVG_CP_IN_12HR | Average shipping amount of similar standard item auctions ending 12 hours before the specified auction started |
| F_STD_CP_IN_12HR | Std. Dev. of the shipping amounts of similar standard item auctions ending 12 hours before the specified auction started |
| F_MAX_CP_IN_24HR | Maximum Shipping amount of similar standard item auctions ending 1 day before the specified auction started |
| F_MIN_CP_IN_24HR | Minimum shipping amount of similar standard item auctions ending 1 day before the specified auction started |
| F_AVG_CP_IN_24HR | Average shipping amount of similar standard item auctions ending 1 day before the specified auction started |
| F_STD_CP_IN_24HR | Std. Dev. of the shipping amounts of similar standard item auctions ending 1 day before the specified auction started |
| F_MAX_CP_IN_48HR | Maximum shipping amount of similar standard item auctions ending 2 days before the specified auction started |
| F_MIN_CP_IN_48HR | Minimum shipping amount of similar standard item auctions ending 2 days before the specified auction started |
| F_AVG_CP_IN_48HR | Average shipping amount of similar standard item auctions ending 2 days before the specified auction started |
| F_STD_CP_IN_48HR | Std. Dev. of the shipping amounts of similar standard item auctions ending 2 days before the specified auction started |
| F_MAX_CP_IN_60HR | Maximum shipping amount of similar standard item auctions ending 2.5 days before the specified auction started |
| F_MIN_CP_IN_60HR | Minimum shipping amount of similar standard item auctions ending 2.5 days before the specified auction started |
| F_AVG_CP_IN_60HR | Average shipping amount of similar standard item auctions ending 2.5 days before the specified auction started |
| F_STD_CP_IN_60HR | Std. Dev. of the shipping amounts of similar standard item auctions ending 2.5 days before the specified auction started |
| F_MAX_CP_IN_240HR | Maximum shipping amount of similar standard item auctions ending 10 days before the specified auction started |
| F_MIN_CP_IN_240HR | Minimum shipping amount of similar standard item auctions ending 10 days before the specified auction started |
| F_AVG_CP_IN_240HR | Average shipping amount of similar standard item auctions ending 10 days before the specified auction started |
| F_STD_CP_IN_240HR | Std. Dev. of the shipping amounts of similar standard item auctions ending 10 days before the specified auction started |
| F_MAX_CP_ALL | Maximum shipping amount of similar standard item auctions (in stored history) ending before the specified auction started |
| F_MIN_CP_ALL | Minimum shipping amount of similar standard item auctions (in stored history) ending before the specified auction started |
| F_AVG_CP_ALL | Average shipping amount of similar standard item auctions (in stored history) ending before the specified auction started |
| F_STD_CP_ALL | Std. Dev. of the shipping amounts of similar standard item auctions (in stored history) ending before the specified auction started |

TABLE 11.0

Historical Information For No Close Auctions

| | |
|---|---|
| NO_COUNT_CURRENT | Count of failed similar item auctions open when the specified auction started |
| NO_COUNT_IN_5MI | Count of failed similar item auctions ending 5 minutes before the specified auction started |
| NO_COUNT_IN_30MI | Count of failed similar item auctions ending 30 minutes before the specified auction started |
| NO_COUNT_IN_1HR | Count of failed similar item auctions ending 1 hour before the specified auction started |
| NO_COUNT_IN_2HR | Count of failed similar item auctions ending 2 hours before the specified auction started |
| NO_COUNT_IN_4HR | Count of failed similar item auctions ending 4 hours before the specified auction started |
| NO_COUNT_IN_8HR | Count of failed similar item auctions ending 8 hours before the specified auction started |
| NO_COUNT_IN_12HR | Count of failed similar item auctions ending 12 hours before the specified auction started |
| NO_COUNT_IN_24HR | Count of failed similar item auctions ending 1 day before the specified auction started |
| NO_COUNT_IN_48HR | Count of failed similar item auctions ending 2 days before the specified auction started |
| NO_COUNT_IN_60HR | Count of failed similar item auctions ending 2.5 days before the specified auction started |
| NO_COUNT_IN_240HR | Count of failed similar item auctions ending 10 days before the specified auction started |
| NO_COUNT_ALL | Count of failed similar item auctions (in stored history) ending before the specified auction started |

It is therefore intended that the foregoing detailed description be regarded as illustrative rather than limiting, and that it be understood that it is the following claims, including all equivalents, that are intended to define the spirit and scope of this invention.

The invention claimed is:

1. A method for auction result prediction, the method comprising:
    obtaining a participant specified characteristic for a first auction item;
    obtaining historical auction data;
    providing the participant specified characteristic and the historical auction data to a result prediction program executing on a computer;

determining, by a processor in the computer that executes the result prediction program, a predicted auction result comprising multiple end-of-auction price thresholds, associated price threshold confidence measures that specify confidences for the end-of-auction price thresholds, and associated result indicators that specify predicted selling results for the first auction item;

providing, by the computer, the multiple end-of-auction price thresholds, the price threshold confidence measures, and the result indicators to a result selector; and receiving from the result selector a result prediction determined from the multiple end-of-auction price thresholds, the price threshold confidence measures, and the result indicators.

2. The method of claim 1, where obtaining a participant specified characteristic comprises obtaining an auction item image, title, or shipping characteristic.

3. The method of claim 1, where obtaining historical auction data comprises obtaining a prior auction price, prior auction title, or prior auction duration characteristic.

4. The method of claim 1, where the result prediction program comprises a neural network comprising a network output for each of the price threshold confidence measures.

5. The method of claim 1, where obtaining a participant specified characteristic comprises obtaining a seller-specified auction item characteristic, and further comprising obtaining a seller-specified auction characteristic, and a participant specified seller characteristic.

6. The method of claim 1, where obtaining a participant specified characteristic comprises obtaining an auction item newness characteristic, an auction item category characteristic, or an auction item identifier.

7. The method of claim 6, where obtaining a participant specified characteristic further comprises obtaining from an auction item title.

8. The method of claim 1, where obtaining historical auction data comprises obtaining historical auction data for additional auction items similar to the first auction item.

9. An auction result prediction system comprising:
a memory comprising participant specified characteristics for an auction item and historical auction data;
a data collection program stored in the memory and operable to:
communicate a data request to an auction system; and
store auction data resulting from the data request as historical auction data in the memory;
a characteristic derivation program stored in the memory and operable to:
parse the historical auction data to extract a derived characteristic comprising an item characteristic, auction characteristic, participant characteristic, or any combination thereof from the historical auction data; and
build a derived characteristics table comprising the derived characteristic;
a processor coupled to the memory that executes the data collection program and the characteristic derivation program; and
a result predictor coupled to the memory and operable to accept the specified characteristics, the historical auction data, and the derived characteristics table, and generate a predicted auction result based on the specified characteristics, the historical auction data, and the derived characteristics table, wherein the predicted auction result comprises multiple end-of-auction price thresholds, associated price threshold confidence measures that specify confidences for the end-of-auction price thresholds, and associated result indicators that specify predicted selling results for the first auction item.

10. The auction result prediction system of claim 9, where the result predictor comprises a neural network trained on at least a portion of the historical auction data.

11. The auction result prediction system of claim 10, where the predicted auction result comprises a price threshold and a confidence measure.

12. The auction result prediction system of claim 10, where the predicted auction result comprises multiple price thresholds and confidence measures.

13. The auction result prediction system of claim 9, where the result predictor comprises regression logic trained on at least a portion of the historical auction data.

14. The auction result prediction system of claim 9, where the result predictor comprises decision tree logic trained on at least a portion of the historical auction data.

15. The auction result prediction system of claim 9, where the participant specified characteristics comprise seller-specified auction item characteristics.

16. The auction result prediction system of claim 15, where the seller-specified auction item characteristics comprise item name, description, title, or image characteristics.

17. The auction result prediction system of claim 9, where the memory further comprises a seller-specified auction characteristic, and where the result predictor is further operable to accept the seller-specified auction characteristic and generate the predicted auction result.

18. The auction result prediction system of claim 17, where the seller-specified auction characteristic comprises a starting time, starting date, starting price, or shipping characteristic.

19. The auction result prediction system of claim 9, where the memory further comprises a participant specified seller characteristic, and where the result predictor is further operable to accept the participant specified seller characteristic and generate the predicted auction result.

20. The auction result prediction system of claim 19, where the participant specified seller characteristic comprises a seller feedback, sales volume, or membership duration characteristic.

21. The method of claim 1, where the multiple end-of-auction price thresholds comprise a lower bound price threshold for an associated 'Sell' result.

22. The method of claim 1, where the multiple end-of-auction price thresholds comprise an upper bound price threshold for an associated 'No Sell' result.

23. The method of claim 1, where receiving a result prediction comprises receiving a most-likely price prediction.

24. The method of claim 1, where receiving a result prediction comprises receiving a price prediction at which the result indicators transition from 'Sell' to 'No Sell'.

25. The method of claim 1, further comprising providing to the result predictor a participant-provided configuration setting that determines a type of the result prediction for the result selector to generate.

26. The auction result prediction system of claim 9, where the derived characteristic comprises an item shipping characteristic.

27. The auction result prediction system of claim 9, where the derived characteristic comprises an item condition characteristic.

28. An auction result prediction method on a price prediction system comprising:
accepting at the price prediction system participant-specified characteristic data including an auction start time for a participant-specified item from a market participant;

obtaining at the price prediction system auction characteristics from an auction system;

deriving by a processor in the price prediction system auction metrics from the auction characteristics, where the auction metrics include a count of auctions ending within a specific period of time relative to the auction start time for the participant-specified item;

storing in a memory in the price prediction system the auction characteristics and auction metrics as historical auction data;

generating by the processor a predicted auction result comprising multiple end-of-auction price thresholds, associated price threshold confidence measures that specify confidences for the end-of-auction price thresholds, and associated result indicators that specify predicted selling results for the first auction item using the participant-specified characteristic data and the historical auction data;

providing, by the computer, the multiple end-of-auction price thresholds, the price threshold confidence measures, and the result indicators to a result selector;

receiving from the result selector a result prediction determined from the multiple end-of-auction price thresholds, the price threshold confidence measures, and the result indicators; and delivering the auction result prediction to the market participant.

29. The auction result prediction method of claim 28, where generating an auction result prediction comprises generating end-of-auction price thresholds, associated price threshold confidence measures, and result indicators.

30. The auction result prediction method of claim 28 further comprising parsing the auction characteristics to extract derived auction characteristics, and where storing the auction characteristics and auction metrics as historical auction data further comprises storing the derived auction characteristics as historical auction data.

31. The auction result prediction method of claim 28, where the specified period of time comprises a period of time prior to completion of an auction for the participant-specified item.

* * * * *